(12) United States Patent
Okanoue et al.

(10) Patent No.: US 7,486,635 B2
(45) Date of Patent: Feb. 3, 2009

(54) NETWORK SERVICE INFORMATION PROVIDING SYSTEM AND NETWORK SERVICE INFORMATION PROVIDING APPARATUS AND METHOD AND TERMINAL THEREOF

(75) Inventors: Kazuhiro Okanoue, Tokyo (JP); Shuntaro Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 1185 days.

(21) Appl. No.: 10/273,110

(22) Filed: Oct. 18, 2002

(65) Prior Publication Data

US 2003/0081567 A1    May 1, 2003

(30) Foreign Application Priority Data

Oct. 25, 2001    (JP)    ............................. 2001-327043

(51) Int. Cl.
   *H04Q 7/00*    (2006.01)
(52) U.S. Cl. ...................... 370/328; 370/401; 370/338; 370/254
(58) Field of Classification Search ................ 370/328, 370/338, 401, 254–256
   See application file for complete search history.

(56) References Cited

U.S. PATENT DOCUMENTS

| | | | | |
|---|---|---|---|---|
| 5,862,480 A | * | 1/1999 | Wild et al. | ............... 455/432.2 |
| 5,987,328 A | | 11/1999 | Ephremides et al. | |
| 6,002,936 A | * | 12/1999 | Roel-Ng et al. | ........... 455/456.4 |
| 6,151,309 A | * | 11/2000 | Busuioc et al. | .............. 370/328 |
| 6,233,222 B1 | * | 5/2001 | Wallentin | ................... 370/229 |
| 6,556,832 B1 | * | 4/2003 | Soliman | ................. 342/357.06 |

(Continued)

FOREIGN PATENT DOCUMENTS

EP    0 766 490 A2    4/1997

(Continued)

OTHER PUBLICATIONS

"Future Prospect of Mobile Communication System for New Generation- Summary Report of New Generation Mobile Committee", New Generation Mobile Committee of the Special Interest Group on Information and Communications Technology of the Ministry of Public Management, Jun. 25, 2001, pp. 1-15. Http:/www.joho.soumo.go.jp/policyreports/joho_tsusin/bunkakai/abstract.pdf.

*Primary Examiner*—Duc C Ho
(74) *Attorney, Agent, or Firm*—Foley & Lardner LLP

(57) ABSTRACT

A network service information providing system which allows users to readily know a location and radio transmission parameters for connecting to a narrow-area wireless communications system in a system which contains wide-area wireless communications systems and narrow-area wireless communications systems. The user knows his/her own location through a wide-area wireless communications system and sends the location of a narrow-area wireless communications system which he/she wants to connect to, wireless transmission parameters, and other requirements to a wireless area information server. The wireless area information server possesses wireless transmission parameters of narrow-area wireless communications systems and the locations of base stations which provide narrow-area wireless communications services. Upon receiving the user requirements, the wireless area information server informs the user of the service area of the narrow-area wireless communications system nearest to the user via the wide-area wireless communications system.

47 Claims, 15 Drawing Sheets

U.S. PATENT DOCUMENTS

| | | | |
|---|---|---|---|
| 6,744,806 B1 * | 6/2004 | Moore et al. | 375/130 |
| 6,829,222 B2 * | 12/2004 | Amis et al. | 370/238 |
| 2002/0133293 A1 * | 9/2002 | Goldman | 701/213 |
| 2003/0177219 A1 * | 9/2003 | Taib et al. | 709/223 |
| 2004/0190529 A1 * | 9/2004 | Hara | 370/395.42 |

FOREIGN PATENT DOCUMENTS

| | | |
|---|---|---|
| EP | 1 014 742 A1 | 6/2000 |
| JP | 10-248088 A | 9/1998 |
| JP | 2001-53901 A | 2/2001 |
| JP | 2001-112043 A | 4/2001 |

\* cited by examiner

FIG. 6

HOT SPOT NETWORK DATABASE 210-2

| BASE STATION NO. | BASE STATION LOCATION | WIRELESS SYSTEM PROFILE ||||
| --- | --- | --- | --- | --- | --- |
| | | WIRELESS SYSTEM | FREQUENCY | TRANSMISSION POWER | ANTENNA |
| 1 | LATITUDE 34.2325 N, LONGITUDE 135.212 E | 802.11b | 2.402GHz | 15dBm | NON-DIRECTIONAL |
| 2 | LATITUDE 34.2330 N, LONGITUDE 135.215 E | 802.11a | 5.170GHz | 10dBm | NORTH EAST BEAM WIDTH : 30° AZIMUTH : −5° |

FIG. 7

AD HOC NETWORK DATABASE 210-1

| NETWORK NO. | NETWORK LOCATION | WIRELESS SYSTEM PROFILE | | | | COMMUNICATIONS MODE | AD HOC NETWORK PROFILE | | |
|---|---|---|---|---|---|---|---|---|---|
| | | WIRELESS SYSTEM | FREQUENCY | TRANSMISSION POWER | ANTENNA | | AUTHENTICATION CODE | CONTENT | DURATION |
| 1 | LATITUDE 34.2326 N, LONGITUDE 135.212 E | BLUE TOOTH | 2.4GHz/FH | 20dBm | NON-DIRECTIONAL | INTERACTIVE | GROUP A | PRIVATE TALK | 2 HOURS |
| 2 | LATITUDE 34.2332 N, LONGITUDE 135.216 E | BLUE TOOTH | 2.4GHz/FH | 4dBm | NON-DIRECTIONAL | STREAM | ANYONE CAN PARTICIPATE | SOCCER | 12 HOURS |

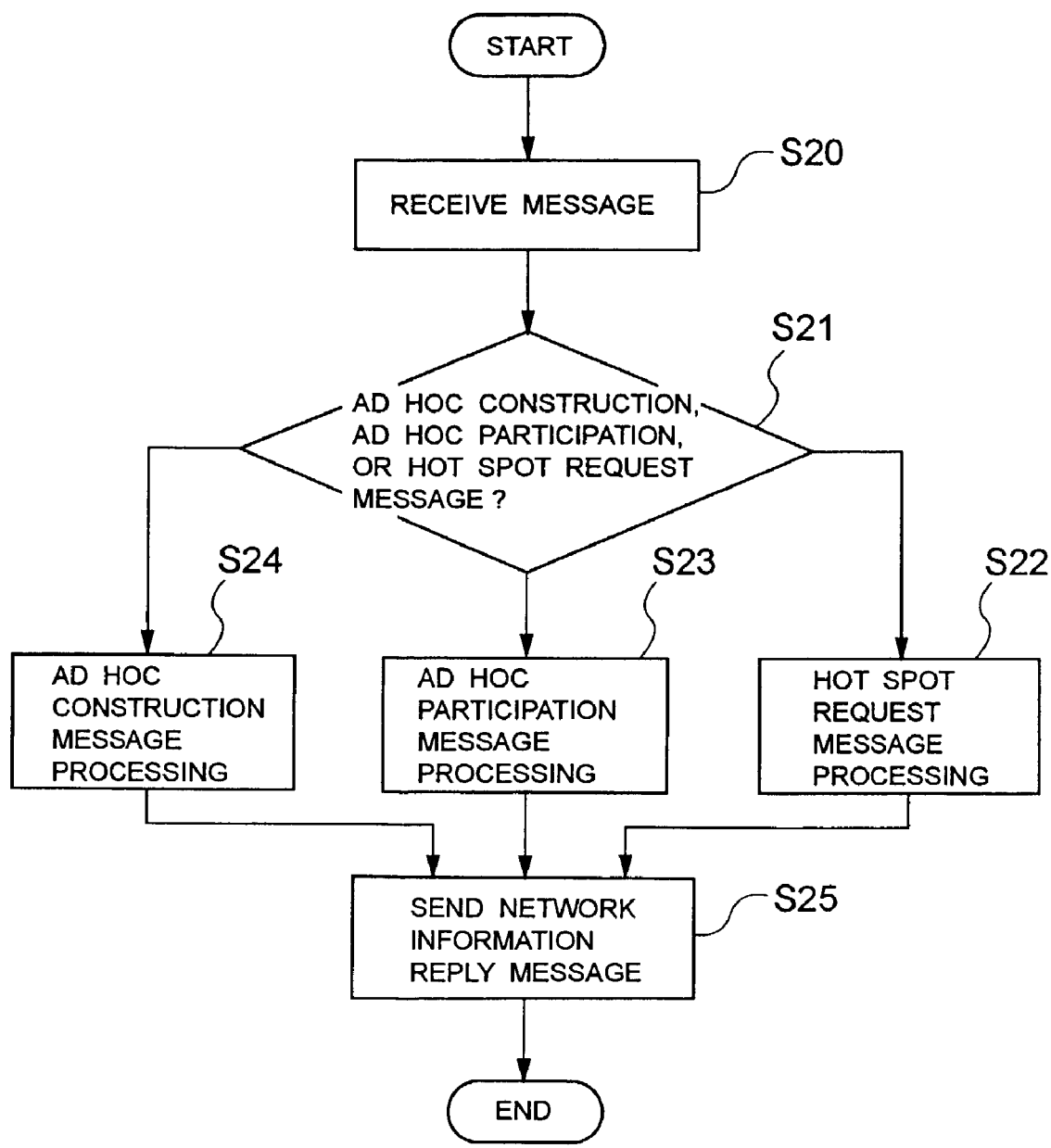

NETWORK SERVICE INFORMATION PROVIDING SYSTEM AND NETWORK SERVICE INFORMATION PROVIDING APPARATUS AND METHOD AND TERMINAL THEREOF

BACKGROUND OF THE INVENTION

1. Field of the Invention

The present invention relates to a network service information providing system and network service information providing apparatus and method and terminal thereof. More particularly, it relates to a network service information providing scheme which efficiently informs the user of a system required by the user and provides information needed for the user to construct a new wireless system and provide service, in an environment where various wireless communications service coexist.

2. Description of the Prior Art

By network type, networks are classified into infrastructure networks where a trunk network managed by an operator has various functions for cutting off communications with terminals used by users, and ad hoc networks (networks formed temporarily of mobile terminals alone without any relay node) where users gather together and terminals communicate with each other directly. In terms of radio used as a transmission medium of a network, there are various schemes including a wireless cellular scheme which has a relatively low transmission rate, but covers a wide area and wireless LAN scheme which has a high transmission rate, but covers a small area.

Systems which employ the wireless LAN scheme can be used as infrastructure networks which connect to the Internet with wireless base stations (access points) installed at stations, airports, and other places where people gather together (hot spots), by taking advantage of its high transmission capacity. The wireless cellular scheme is widely used today for a portable telephone system, which covers a wide area throughout the country and is used as an infrastructure network, allowing communications to be conducted anywhere independent of location.

On the other hand, it is also possible to set up a so-called ad hoc network by interconnecting not only equipment around the user, but also the user's terminal and another user's terminal located nearby using short-range radio system, as typified by "Bluetooth," which covers a range of 10 meters or less and is intended to interconnect equipment around the user, such as a portable telephone terminal and portable computer.

Such wireless systems can coexist with each other as shown in FIG. 17. A summary report (http://www.joho.soumu.go.jp/policyreports/joho_tsusin/bunk akai/abstract.pdf) by the New Generation Mobile Committee of the Special Interest Group on Information and Communications Technology of the Ministry of Public Management, Home Affairs, Posts and Telecommunications recommends that optimal wireless systems should be used according to specific needs of users. In FIG. 17, reference numeral 100 denotes the Internet, 101 denotes a cell of a cellular system, 102-1 and 102-2 denote cells of a wireless LAN system, and 103-1 and 103-2 denote ad hoc network cells.

The Internet 100, which serves as an infrastructure for the cell 101 of the cellular system and the cells 102-1 and 102-2 of the wireless LAN system, provide interconnection for them. Although only one cell 101 of the cellular system is shown in the figure for the sake of simplicity, there exist a plurality of adjacent cells with the cellular system covering a wide area.

The cells 102-1 and 102-2 of the wireless LAN system are connected to the Internet 100 and provide high-speed Internet connection services to hot spots crowded with users. The cells 102-1 and 102-2 of the wireless LAN system may be managed by different administrations because cells can be set up without permission using, for example, a wireless LAN in the 2.4-GHz ISM (Industrial Scientific Medical) band.

On the other hand, the ad hoc networks 103-1 and 103-2 form closed local networks without being connected to the Internet 100, which is an infrastructure. In these circumstances, a user who wants to access the Internet 100 can do so (1) via a wireless LAN system if he/she can connect to the cell 102-1 or 102-2 of the wireless LAN system, or (2) via a cellular system if he/she is out of reach to the cells 102-1 and 102-2 of the wireless LAN system.

Also, a user who wants to communicate with another user close by without connecting to an infrastructure such as the Internet can newly construct the ad hoc network 103-1 or 103-2.

If the ad hoc networks 103-1 and 103-2, the cell 101 of the cellular system which is an infrastructure network, and the cells 102-1 and 102-2 of the wireless LAN system coexist, control methods for connecting to an appropriate network or constructing an ad hoc network with consideration given to connectability to various networks and needs of users are available to allow users to connect to both the ad hoc networks and infrastructure network, connect to a desired network, or construct a new ad hoc network.

In a network environment in which various wireless systems coexist as shown in FIG. 17, possible services available to users include:

1) low-speed, but wide-area Internet access via a cellular system, 2) high-speed Internet access via a wireless LAN although limited to hot spots, 3) participation in local communications services provided by existing ad hoc networks, and 4) construction of a new ad hoc network and commencement of local communications services.

Regarding service 1), since cellular systems have a wide service area, users can receive the service regardless of their location. Regarding services 2) and 3), since service areas themselves are small, the users who want to receive service must move to the appropriate service area. In doing that, if the users know the service areas of services 2) and 3), they can move easily. However, services 2) to 4) have the following problems.

As for service 2), since changes occur in radio wave propagation characteristics as well as in the service area along with new construction or disuse of wireless LAN base stations or changes in building or structure layouts, it is difficult for users to keep updated. As to service 3), since the service is local, it is not possible to tell the duration and location of an ad hoc network in advance. Consequently, users cannot obtain information about the ad hoc network in advance and can only participate in it by chance. In the case of service 4), when constructing a new ad hoc network, it may interfere with any existing network around it, resulting in degradation of overall throughput.

Regarding providers which provide hot spot services using a wireless LAN, since there is no licensing system concerning the ISM band, different providers can provide hot spot services independently. Thus, there is high flexibility in providing services. However, existence of hot spots set up haphazardly may cause interference among them, resulting in significant degradation of throughput provided to the user.

An object of the present invention is to provide a network service information providing system and network service information providing apparatus and method and terminal therefor which allow users to readily know a location and radio transmission parameters for connecting to a narrow-area wireless communications system in a system which contains a mixture of wide-area wireless communications systems and narrow-area wireless communications systems and to set up a new narrow-area wireless communications system which can provide higher communications services without causing degradation in existing communications services in the environment where different wireless communications systems coexist.

BRIEF SUMMARY OF THE INVENTION

The present invention provides a network service information providing system in a communications system which contains a mixture of first wireless communications systems (hereinafter referred to as narrow-area wireless communications systems) for providing wireless communications service to designated areas and second wireless communications systems (hereinafter referred to as wide-area wireless communications systems) for providing wireless communications service to areas wider than the above described designated areas and which includes terminals capable of connecting at least to the above described wide-area wireless communications systems, the above described network service information providing system comprising: network service information detecting means which possesses information about each of the above described narrow-area wireless communications systems and which provides information about service areas of the above described narrow-area wireless communications systems as network service information to the above described terminals in response to requests from the above described terminals via the above described wide-area wireless communications systems.

The present invention provides another network service information providing system in a wireless communications system which contains a mixture of wireless communications systems (hereinafter referred to as narrow-area wireless communications systems) for providing wireless communications service to designated areas, the above described network service information providing system comprising: network service information detecting means which estimates communications service quality resulting from installation of a new narrow-area wireless communications system in response to an installation request to install the new narrow-area wireless communications system, and provides installation conditions by modifying the above described installation request if it is estimated that the communications service quality will fall below a designated threshold.

Also, the present invention provides a network service information providing apparatus in a communications system which contains a mixture of first wireless communications systems (hereinafter referred to as narrow-area wireless communications systems) for providing wireless communications service to designated areas and second wireless communications systems (hereinafter referred to as wide-area wireless communications systems) for providing wireless communications service to areas wider than the above described designated areas, wherein the above described network service information providing apparatus is intended to provide network service information to a terminal capable of connecting at least to the above described wide-area wireless communications systems and comprises: network service information detecting means which possesses information about each of the above described narrow-area wireless communications systems and which provides information about service areas of the above described narrow-area wireless communications systems as network service information to the above described terminals in response to requests from the above described terminals via the above described wide-area wireless communications systems.

The present invention provides another network service information providing apparatus for providing network service information in a wireless communications system which contains a mixture of wireless communications systems (hereinafter referred to as narrow-area wireless communications systems) for providing wireless communications service to designated areas, the above described network service information providing system comprising: network service information detecting means which estimates communications service quality resulting from installation of a new narrow-area wireless communications system in response to an installation request to install the new narrow-area wireless communications system, and provides installation conditions by modifying the above described installation request if it is estimated that the communications service quality will fall below a designated threshold.

The present invention provides a network service information providing method in a communications system which contains a mixture of first wireless communications systems (hereinafter referred to as narrow-area wireless communications systems) for providing wireless communications service to designated areas and second wireless communications systems (hereinafter referred to as wide-area wireless communications systems) for providing wireless communications service to areas wider than the above described designated areas and which includes terminals capable of connecting at least to the above described wide-area wireless communications systems as well as includes a network service information providing apparatus intended to provide network service information in response to requests from the above described terminals, the above described network service information providing method comprising in the above described network service information providing apparatus: a step of preparing information about each of the above described narrow-area wireless communications systems and providing information about service areas of the above described narrow-area wireless communications systems as network service information to the above described terminals in response to requests from the above described terminals via the above described wide-area wireless communications systems.

The present invention provides another network service information providing method in a wireless communications system which contains a mixture of wireless communications systems (hereinafter referred to as narrow-area wireless communications systems) for providing wireless communications service to designated areas, the above described network service information providing method comprising: a step of estimating communications service quality resulting from installation of a new narrow-area wireless communications system in response to an installation request to install the new narrow-area wireless communications system, and offering installation conditions by modifying the above described installation request if it is estimated that the communications service quality will fall below a designated threshold.

The present invention provides an operation control method for a network service information providing apparatus in a communications system which contains a mixture of first wireless communications systems (hereinafter referred to as narrow-area wireless communications systems) for providing wireless communications service to designated areas and second wireless communications systems (hereinafter referred to as wide-area wireless communications systems) for providing wireless communications service to areas wider than the above described designated areas and which includes terminals capable of connecting at least to the above described wide-area wireless communications systems as well as includes the above described network service information providing apparatus intended to provide network service information in response to requests from the above described terminals, the above described operation control method comprising: a step of preparing information about each of the above described narrow-area wireless communications systems and providing information about service areas of the above described narrow-area wireless communications systems as network service information to the above described terminals in response to requests from the above described terminals via the above described wide-area wireless communications systems.

The present invention provides another operation control method for a network service information providing apparatus in a wireless communications system which contains a mixture of wireless communications systems (hereinafter referred to as narrow-area wireless communications systems) for providing wireless communications service to designated areas, the above described operation control method comprising: a step of estimating communications service quality resulting from installation of a new narrow-area wireless communications system in response to an installation request to install the new narrow-area wireless communications system, and offering installation conditions by modifying the above described installation request if it is estimated that the communications service quality will fall below a designated threshold.

The present invention provides a terminal in a network service information providing system which contains a mixture of first wireless communications systems (hereinafter referred to as narrow-area wireless communications systems) for providing wireless communications service to designated areas and second wireless communications systems (hereinafter referred to as wide-area wireless communications systems) for providing wireless communications service to areas wider than the above described designated areas and which includes a network service information providing apparatus that possesses information about each of the above described narrow-area wireless communications systems and that provides information about service areas of the above described narrow-area wireless communications systems as network service information to the above described terminals in response to requests from the above described terminals via the above described wide-area wireless communications systems, the above described terminal comprising: means for sending its location information and conditions for the narrow-area wireless communications system to which it wants to connect, as one of the above described requests to the above described network service information providing apparatus via appropriate one of the above described wide-area wireless communications systems.

The present invention provides a recording medium containing a program for making a computer execute operations of a network service information providing apparatus in a communications system which contains a mixture of first wireless communications systems (hereinafter referred to as narrow-area wireless communications systems) for providing wireless communications service to designated areas and second wireless communications systems (hereinafter referred to as wide-area wireless communications systems) for providing wireless communications service to areas wider than the above described designated areas and which includes terminals capable of connecting at least to the above described wide-area wireless communications systems as well as includes the above described network service information providing apparatus intended to provide network service information in response to requests from the above described terminals, the above described program comprising: a step of preparing information about each of the above described narrow-area wireless communications systems and providing information about service areas of the above described narrow-area wireless communications systems as network service information to the above described terminals in response to requests from the above described terminals via the above described wide-area wireless communications systems.

The present invention provides another recording medium containing a program for making a computer execute operations of a network service information providing apparatus in a wireless communications system which contains a mixture of wireless communications systems (hereinafter referred to as narrow-area wireless communications systems) for providing wireless communications service to designated areas, the above described program comprising: a step of estimating communications service quality resulting from installation of a new narrow-area wireless communications system in response to an installation request to install the new narrow-area wireless communications system, and offering installation conditions by modifying the above described installation request if it is estimated that the communications service quality will fall below a designated threshold.

Now, operation of the present invention will be described. The present invention keeps track of the state of radio wave propagation concerning hot spots and ad hoc networks using a wireless area information server which can estimate radio wave propagation characteristics based on parameters such as relative locations of surrounding buildings or other structures and wireless systems, transmission power, and frequencies. The following services are provided based on the wireless area information server.

Specifically, a cellular system, which is a wide-area system, can be used for communications between the wireless area information server and users. Any user who wants to use hot spot services notifies the wireless area information server of his/her own location and then the wireless area information server informs the user about the service areas of hot spots close to the user. This allows the user to know the locations of the hot spots.

Furthermore, the wireless area information server can similarly provide users who want to participate in existing ad hoc networks with information about ad hoc networks close to them. Besides, any user who wants to construct a new ad hoc network notifies the wireless area information server of his/her own location, and then the wireless area information server informs the user of recommended values for transmission power and working frequency in order for the network to achieve high throughput, taking into consideration possible interference around the location. Also, wireless area information server memorizes the existence of the new ad hoc network for subsequent use in answering inquiries from users who want to participate in ad hoc networks or estimating radio wave propagation environments.

Hot spot service providers using wireless LANs notify the wireless area information server of parameters such as expected installation sites, transmission power, and frequencies of wireless LAN base stations. The wireless area information server estimates interferences from surroundings as well as radio coverage and inform the hot spot service providers. This information allows the hot spot service providers to provide services, based on optimum conditions such as maximum throughput. Furthermore, based on the installation sites of the wireless LAN base stations, the wireless area information server be used to presume information to be provided to users who want hot spot services as well as to other hot spot service providers.

Thus, by introducing the wireless area information server which can estimate radio wave propagation characteristics, it is possible to inform the user of an appropriate wireless system from among different wireless systems in a timely manner in step with ever changing radio wave propagation environment caused by new construction and disuse of wireless base stations, emergence of ad hoc networks, relocation of buildings or other structures, etc.

BRIEF DESCRIPTION OF THE DRAWINGS

FIG. 6 is an exemplary data structure of hot spot network databases 210-2 and 710-1;

FIG. 7 is an exemplary data structure of ad hoc network database 210-1;

FIG. 8 is a flowchart showing overall operation of the first embodiment of the present invention;

DETAILED DESCRIPTION OF THE PREFERRED EMBODIMENTS

Figure 1:
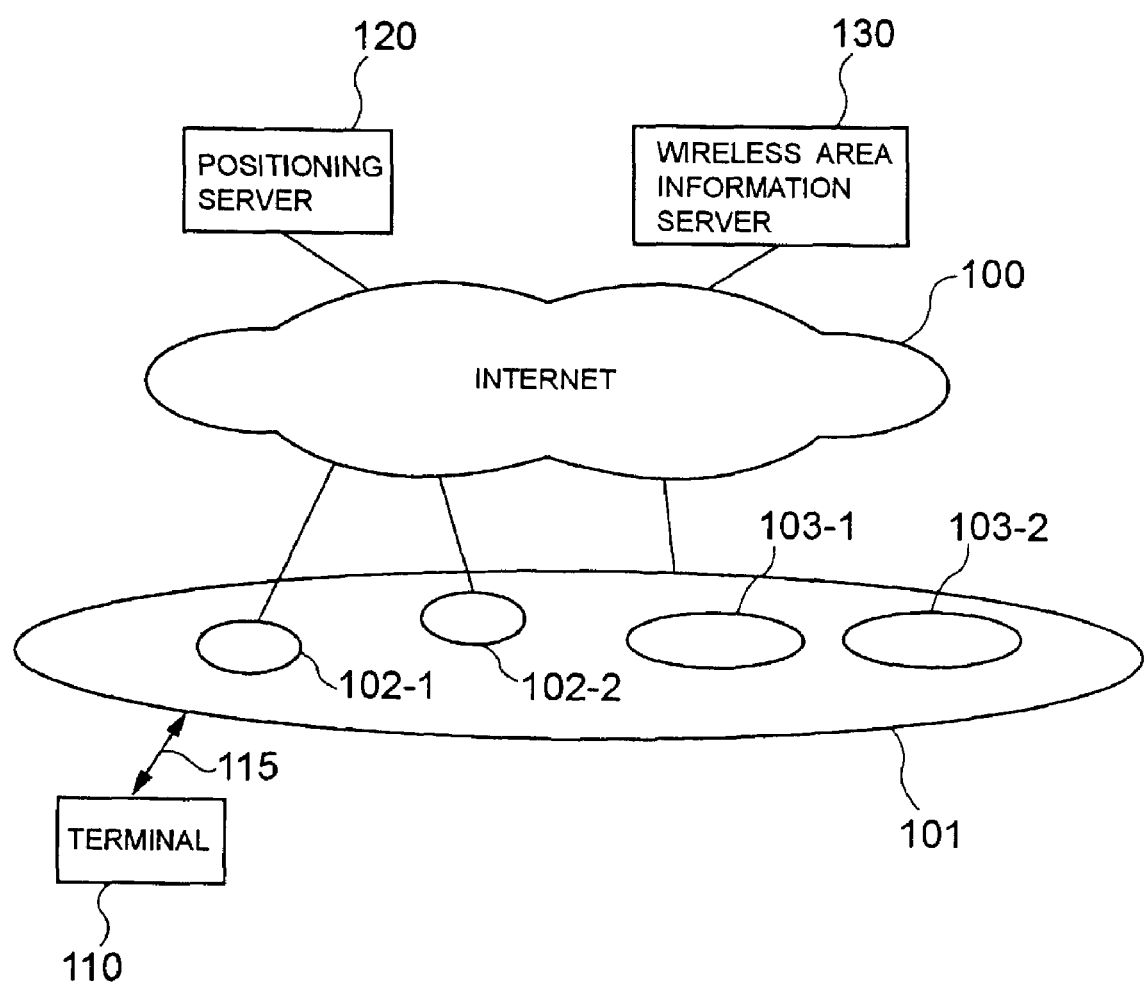
FIG. 1 is an exemplary system configuration illustrating a first embodiment of the present invention.

An embodiment of a network service information providing method according to the present invention will be described in detail by taking the system configuration in FIG. 1 as an example. In FIG. 1, reference numeral 100 denotes the Internet, 101 denotes a cell of a cellular system, 102-1 and 102-2 denote cells of a wireless LAN system, and 103-1 and 103-2 denote ad hoc network cells, 110 denotes a terminal, 115 denotes a wireless line, 120 denotes a positioning (position measuring) server, and 130 denotes a wireless area information server.

The Internet 100, which serves as an infrastructure for the cell 101 of the cellular system and the cells 102-1 and 102-2 of the wireless LAN system, provide interconnection for them. Although only one cell 101 of the cellular system is shown in FIG. 1 for the sake of simplicity, there exist a plurality of adjacent cells with the cellular system covering a wide area.

The cells 102-1 and 102-2 of the wireless LAN system are connected to the Internet 100 and provides high-speed Internet connection services to hot spots crowded with users. The cells 102-1 and 102-2 of the wireless LAN system may be managed by different administrations because cells can be set up without permission using, for example, a wireless LAN in the 2.4-GHz ISM band.

On the other hand, the ad hoc networks 103-1 and 103-2 form closed local networks without being connected to the Internet 100 which is an infrastructure. The terminal 110 is connected to the cell 101 of the cellular system via the wireless line 115. The user's terminal 110 is equipped with communications interfaces of other wireless systems so that it can connect to other wireless systems such as the cells 102-1 and 102-2 of the wireless LAN system and the ad hoc networks 103-1 and 103-2. Also, the user may have both terminal 110 which can connect to wide-area wireless communications systems and terminal which can connect to other wireless systems such as the cells 102-1 and 102-2 of the wireless LAN system and the ad hoc networks 103-1 and 103-2.

Figure 2:
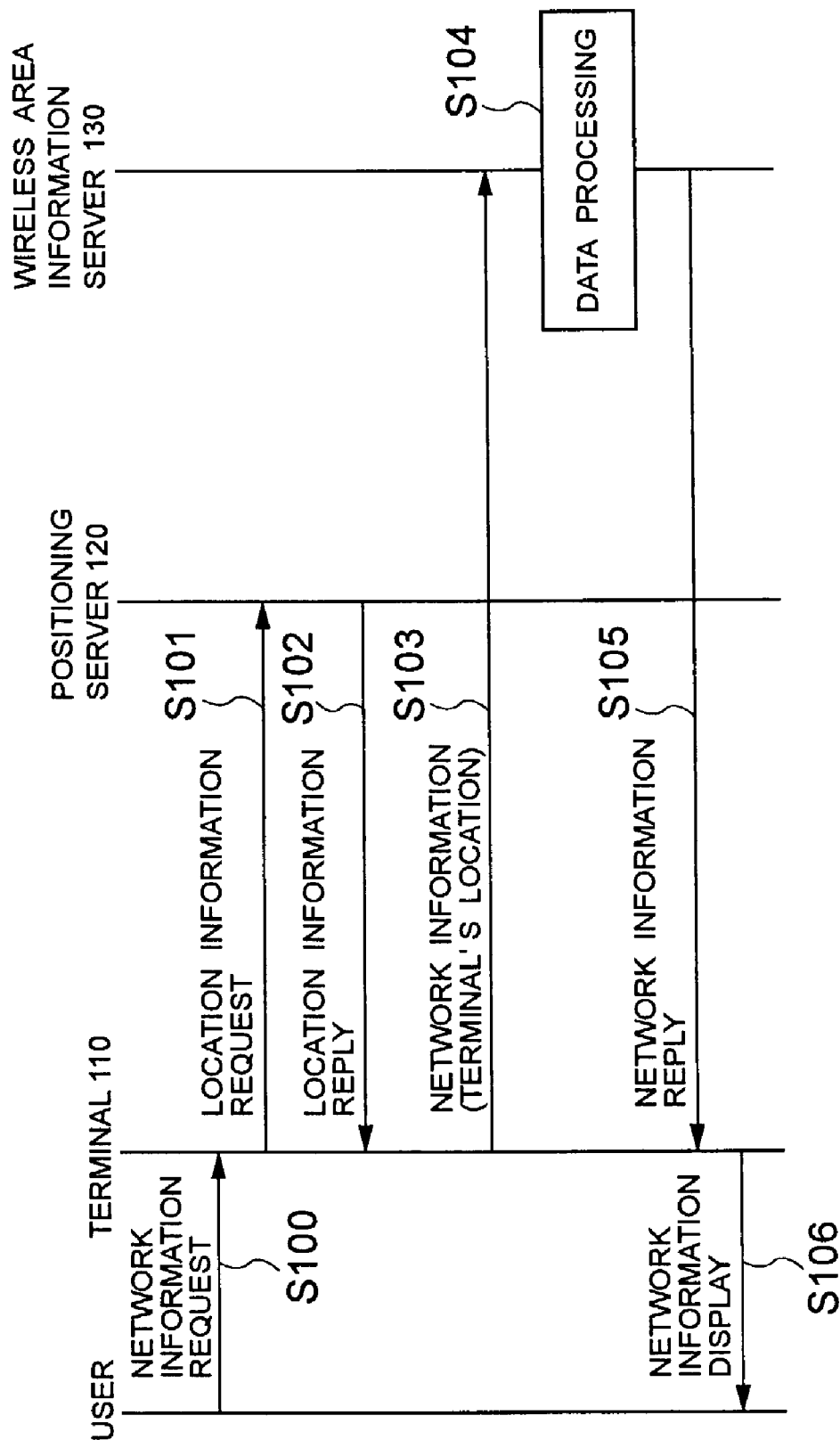
FIG. 2 is an exemplary sequence according to the first embodiment of the present invention.

FIG. 2 is an exemplary basic sequence of the network service information providing method for the system configuration in FIG. 1 according to the present invention. First, to obtain information about a desired network, the user of the terminal 110 makes a network information request to the terminal (S100). According to the request from the user, the terminal 110 sends a location information request message to the positioning server 120 to measure the location of the terminal 110 (S101). In response to the location information request message, the positioning server 120 sends the terminal 110 a location information reply message containing the location of the terminal 110 (S102).

The terminal 110 sends its own location contained in the location information reply message to the wireless area information server 130 together with the network information request entered by the user(S103). The wireless area information server 130 carries out processing based on the location of the terminal 110 and the network information request made by the user (S104), and returns the information requested by the user to the terminal 110 as a network information reply message (S105). Upon receiving the network information reply message, the terminal 110 displays it for the user (S106). Incidentally, although the positioning server 120 is provided in the example of FIG. 1, if the terminal 110 itself has position measurement capability, there is no need to install the positioning server.

In this basic sequence, the network information request from the user can be, for example, one of the following three requests:

1) request for information about locations where nearby hot spot services can be received to take advantage of higher-speed transmission (hereinafter referred to as a hot spot request);

2) request for information about nearby ad hoc networks which match user's interests and in which the user can participate (hereinafter referred to as an ad hoc participation request); and 3) request for information about conditions for constructing a new ad hoc network (hereinafter referred to as an ad hoc construction request).

Figure 3:
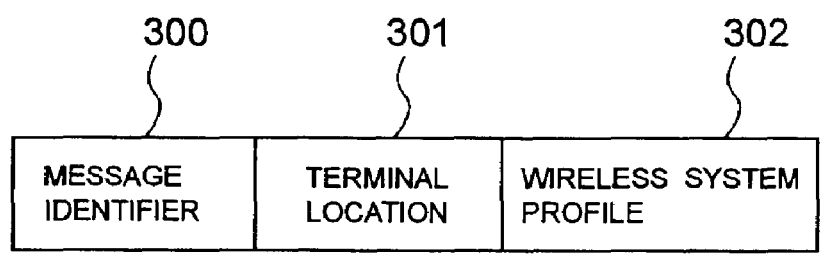
FIG. 3 is a sample format of a hot spot request message.

Hot spot request messages can have, for example, the format shown in FIG. 3. In the figure, reference numeral 300 denotes a message identifier field, 301 denotes a terminal location field, and 302 denotes a wireless system profile field. The wireless system profile field 302 describes requirements for a hot spot, such as the types of wireless system to which the terminal can be connected.

Figure 4:
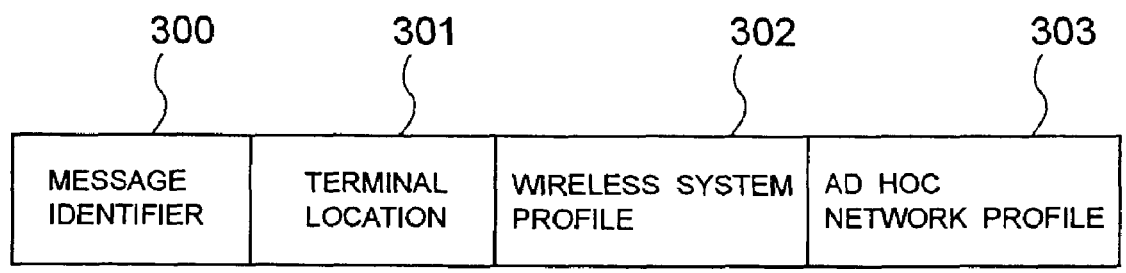
FIG. 4 is a sample format of an hoc participation request message and ad hoc construction request message.

Ad hoc participation request and ad hoc construction request messages can have, for example, the format shown in FIG. 4. This message has an ad hoc network profile field 303 indicating an ad hoc profile in addition to the messages shown in FIG. 3. In the case of an ad hoc participation request message, requirements for a desired ad hoc network are described in the ad hoc network profile field 303. (As described later, an example of the requirements is shown in FIG. 7). On the other hand, an ad hoc construction request message contains conditions for a desired ad hoc network.

Differences in operation among the different types of message boil down to differences in the operation of the wireless area information server 130. A system diagram of the wireless area information server 130 will be shown first and then the operations in the three cases will be described in detail.

Figure 5:
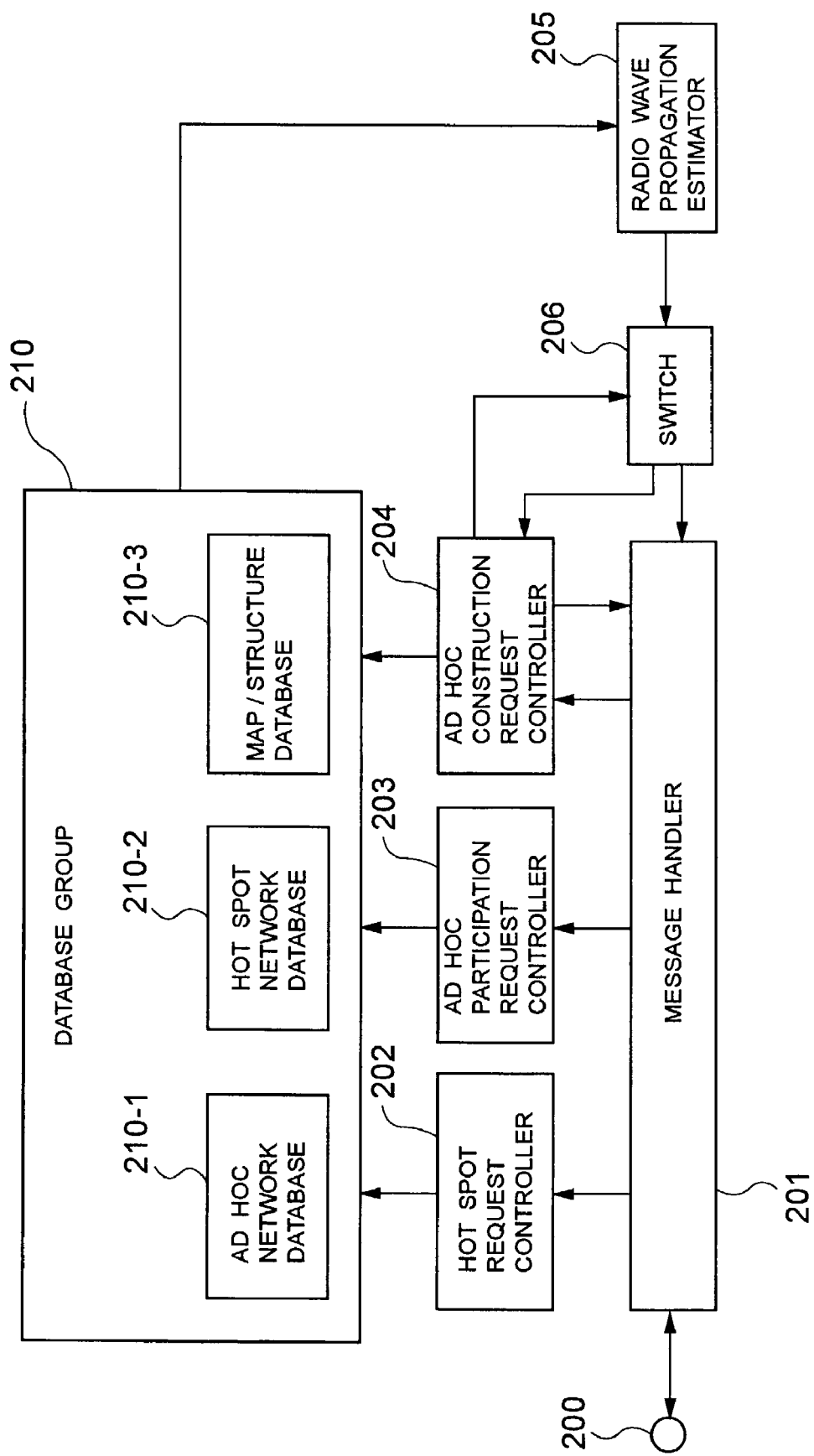
FIG. 5 is a system diagram showing an example of a wireless area information server 130.

FIG. 5 is a system diagram showing an example of the wireless area information server 130. In the figure, reference numeral 200 denotes an input/output terminal, 201 denotes a message handler, 202 denotes a hot spot request controller, 203 denotes an ad hoc participation request controller, 204 denotes an ad hoc construction request controller, 205 denotes a radio wave propagation estimator, 206 denotes a switch, and 210 denotes a database group.

The database group 210 consists of an ad hoc network database 210-1, hot spot network database 210-2, and map/structure database 210-3. The hot spot network database 210-2 and ad hoc network database 210-1 can be configured, for example, as shown in FIGS. 6 and 7, respectively.

FIG. 6 is an example of the hot spot network database 210-2, which consists of the locations and wireless system profiles of base stations like the cells 102-1 and 102-2 of the hot spot which provide wireless communications services to areas. The wireless system profile consists, for example, of parameters which characterize the wireless services provided by the base station, including wireless system information which represents the type of wireless system, frequency used, transmission power, and antenna directivity. Other parameters such as installation height of the base station may also be included.

FIG. 7 is an example of the ad hoc network database 210-1, which consists of the locations (e.g., locations of host terminals) of ad hoc networks such as the ad hoc network cells 103-1 and 103-2 opened in areas, wireless system profiles for providing communication services, and ad hoc network profiles which characterize the ad hoc networks. The wireless system profile can consist of the same parameters as in FIG. 6. The ad hoc network profile contains, for example, a major communications mode used on the ad hoc network (interactive, stream, data, or the like), an authentication code which controls permission/rejection of participation, content shared within the ad hoc network, and the expected duration of existence of the ad hoc network. It is also possible to include information such as a contact address of the organizer of the ad hoc network.

The map/structure database 210-3 outputs structure data about the sizes, layouts, etc. of outdoor structures such as buildings and roads or indoor structures such as walls, desks, and other furnitures when an area is specified. It is also possible to include physical property data of structures in the structure data. The radio wave propagation estimator 205 estimates and outputs radio wave propagation environment as well as the interference characteristics and wireless communications quality of the wireless system, based on outputs from the databases 210.

Operations performed by the wireless area information server 130 with the above configuration after a hot spot request message, ad hoc participation request message, or ad hoc construction request message is entered will be described with reference to flowcharts in FIGS. 8 to 11. First, referring to FIG. 8, when a message is entered via the input terminal 200 (Step S20), message handler 201 judges whether the message is a hot spot request message, ad hoc participation request message, or ad hoc construction request message by referring to the message identifier field 300 of the entered message (Step S21) and supplies the received message to the appropriate controller, namely, hot spot request controller 202, ad hoc participation request controller 203, or ad hoc construction request controller 204 (Steps S22 to S24).

Depending on the entered message, the hot spot request controller 202, ad hoc participation request controller 203, or ad hoc construction request controller 204 operates as follows by controlling the database group 210.

Figure 9:
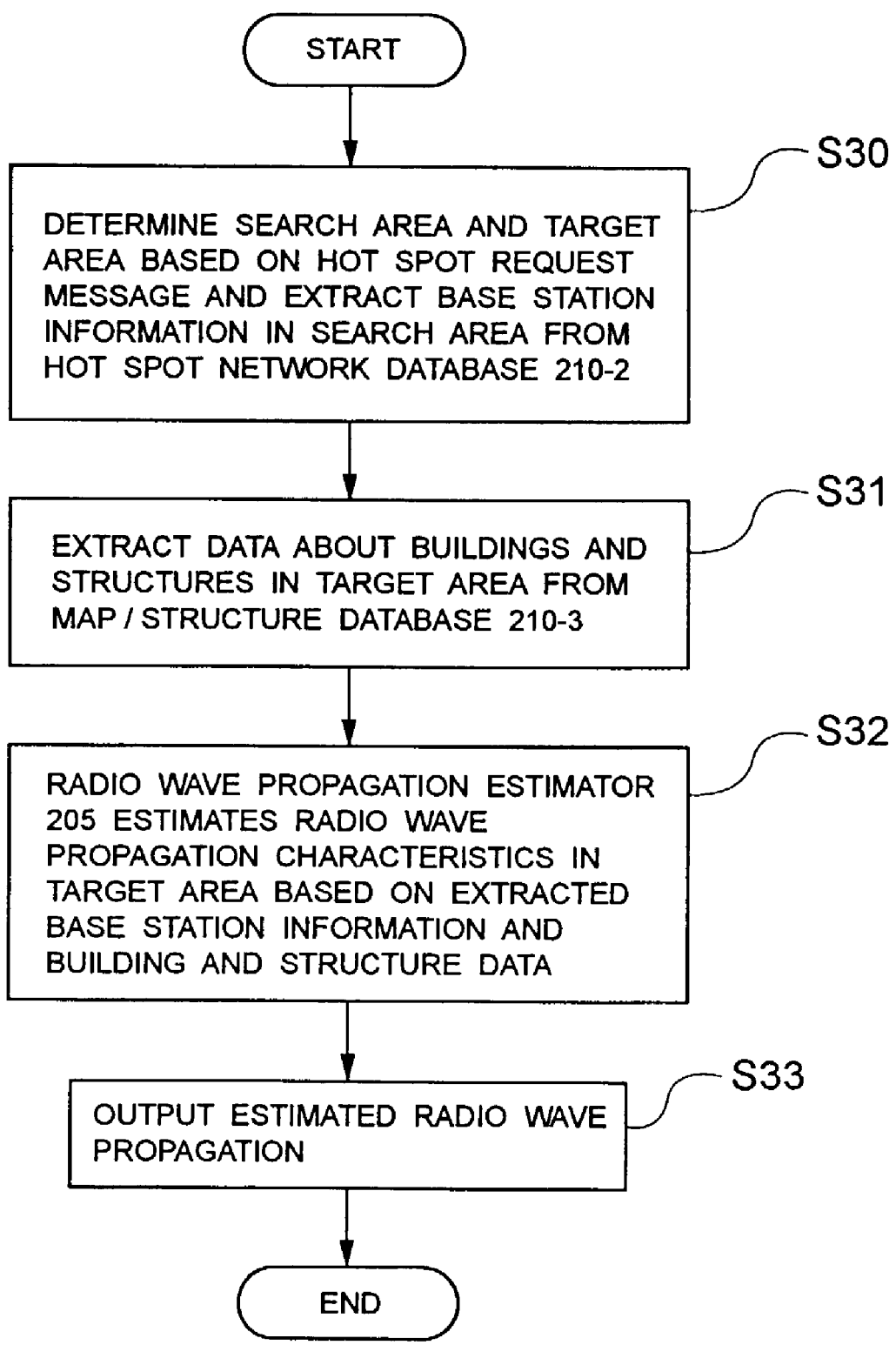
FIG. 9 is a flowchart showing details of a process of Step S22 in FIG. 8.

To begin with, operation of the hot spot request controller 202 and radio wave propagation estimator 205 will be described with reference to FIG. 9. Based on the entries of the terminal location field 301 and wireless system profile field 302, the hot spot request controller 202 searches the hot spot network database 210-2 and extracts base stations for hot spots located in a search area, for example, within a 500-m radius of the terminal (Step S30). Then, it controls the database group 210 so as to output base stations which meet the requirements described in the wireless system profile field 302, as prospective base stations. The size of the search area may be included in the hot spot request message sent from the terminal.

Then, based on the terminal location field 301 contained in the message, the hot spot request controller 202 controls the databases 210 so as to extract, from the map/structure database 210-3, structure data such as the sizes and layouts of structures located in a target area, for example, within a 750-m radius of the terminal, an area which includes the search area (Step S31). The extracted information about the wireless base stations and data about buildings and structures are supplied to the radio wave propagation estimator 205, which estimates radio wave propagation characteristics in the target area based on the supplied data (Step S32). As a method of estimating the radio wave propagation characteristics, a known ray launching method can be used. The results of estimation are output to the message handler 201 (Step S33).

Figure 10:
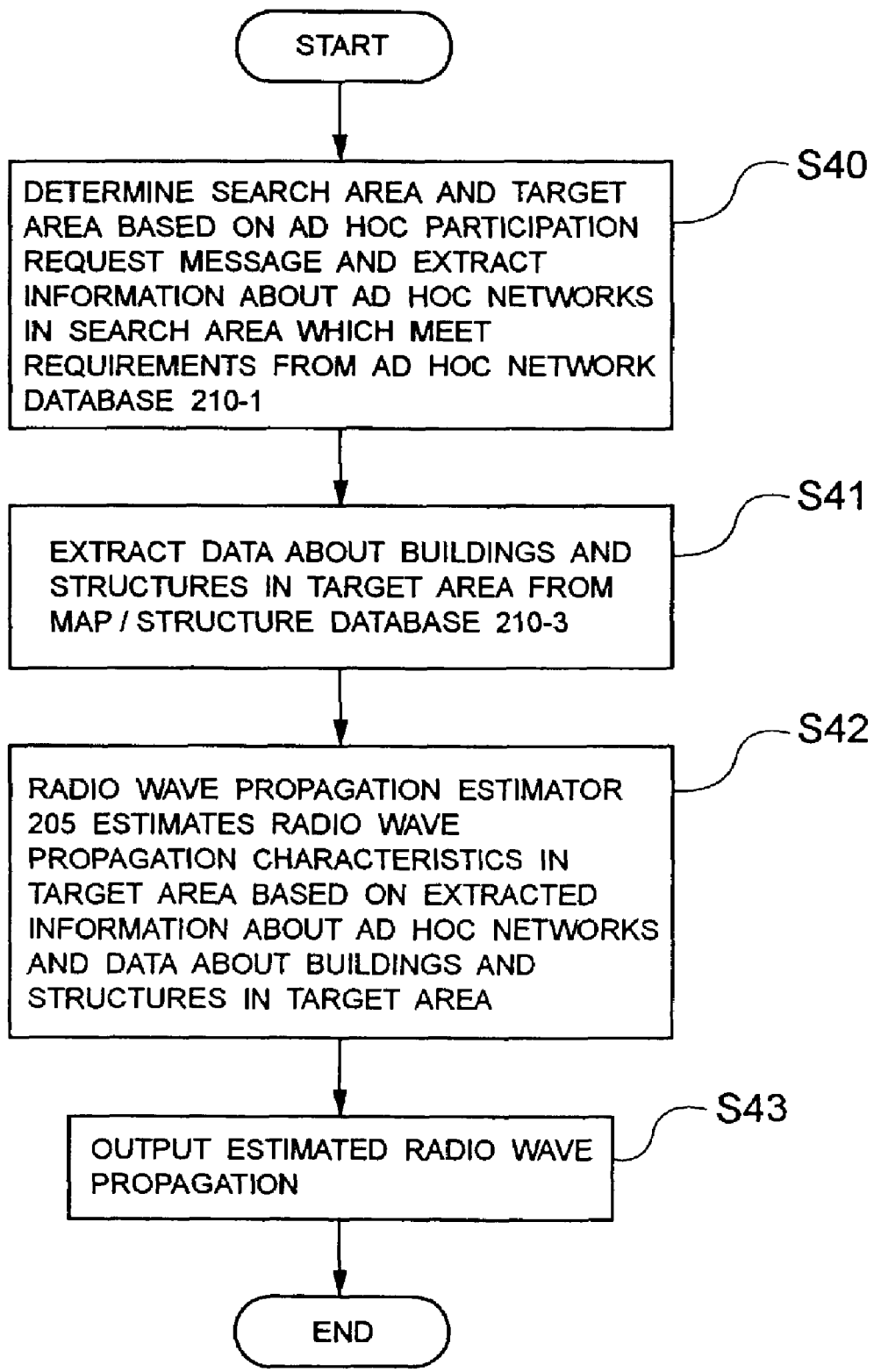
FIG. 10 is a flowchart showing details of a process of Step S23 in FIG. 8.

Now, operation of the ad hoc participation request controller 203 and radio wave propagation estimator 205 will be described with reference to FIG. 10. Based on the entries of the terminal location field 301, wireless system profile field 302, and ad hoc network profile field 303 contained in the message, the ad hoc participation request controller 203 controls the databases 210 so as to output the ad hoc networks which exist in the search area described above and meet the requirements described in the wireless system profile field 302 and ad hoc network profile field 303 from the ad hoc network database 210-1 as prospective ad hoc networks (Step S40). The size of the search area may be included in the ad hoc participation message sent from the terminal.

Then, based on the terminal location field 301 contained in the message, the ad hoc participation request controller 203 controls the databases 210 so as to extract structure data such as the sizes and layouts of structures located in the target area described above (Step S41) from the map/structure database 210-3. The extracted information about the ad hoc networks and data about buildings and structures in the target area are supplied to the radio wave propagation estimator 205, which estimates radio wave propagation characteristics in the target area based on the supplied data (Step S42). As a method of estimating the radio wave propagation characteristics, the known ray launching method described above can be used. The results of estimation are output to the message handler 201 (Step S43).

Figure 11:
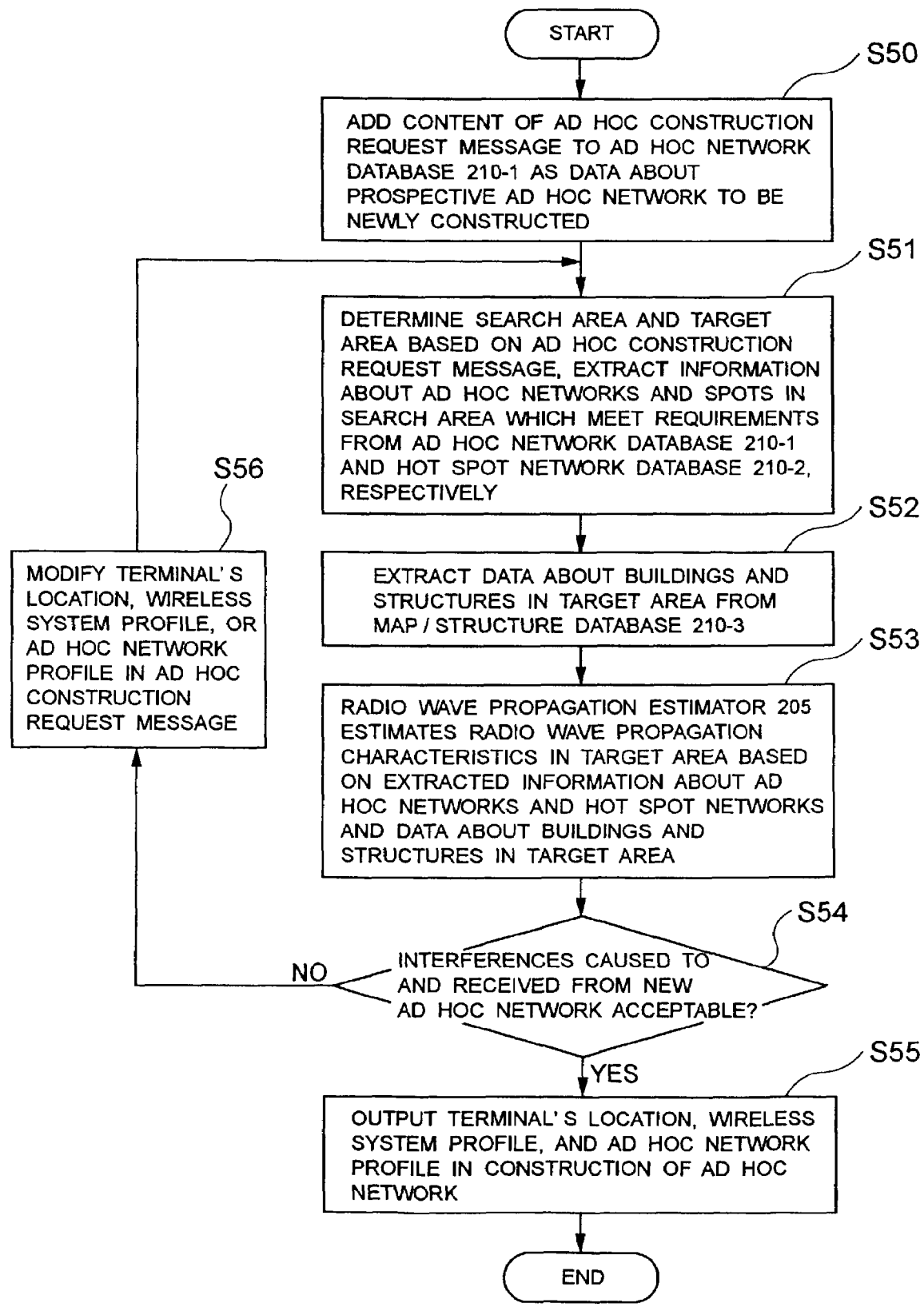
FIG. 11 is a flowchart showing details of a process of Step S24 in FIG. 8.

Now, operation of the ad hoc construction request controller 204 and radio wave propagation estimator 205 will be described with reference to FIG. 11. The ad hoc construction request controller 204 adds the entries of the terminal location field 301, wireless system profile field 302, and ad hoc network profile field 303 contained in the message to the ad hoc network database 210-1 as data about a prospective ad hoc network to be newly constructed (Step S50).

Then, based on the entries of the terminal location field 301, wireless system profile field 302, and ad hoc network profile field 303 contained in the message, the ad hoc construction request controller 204 controls the databases 210 so as to extract, from the ad hoc network database 210-1, all the base stations and ad hoc networks which exist in the search area described above and which can cause interference to or receive interference from the prospective ad hoc network to be newly constructed (Step S51). In so doing, the prospective ad hoc network to be newly constructed is also extracted. Also, the ad hoc construction request controller 204 controls the switch 206 to input the output from the radio wave propagation estimator 205 into the ad hoc construction request controller 204 (Step S52).

Then, the extracted information about the ad hoc network and data about buildings and structures in the target area are supplied to the radio wave propagation estimator 205, which estimates radio wave propagation characteristics in the target area based on the supplied data (Step S53). As a method of estimating the radio wave propagation characteristics, the known ray launching method described above can be used. After evaluating the output from the radio wave propagation estimator 205, the ad hoc construction request controller 204 evaluates the interference caused to and received from other ad hoc networks and hot spots by the prospective ad hoc network if added (Step S54). The evaluation is made by computing and comparing the amount of the received interference with a designated threshold.

If the results of the estimation show that both caused and received interferences resulting from the addition of the prospective ad hoc network to be newly constructed are acceptable, the ad hoc construction request controller 204 outputs a terminal's location, wireless system profile, and ad hoc network profile which characterize the prospective ad hoc network to be newly constructed to the message handler 201 (Step S55).

If the caused or received interference resulting from the addition of the prospective ad hoc network to be newly constructed is expected to impair communications quality, the ad hoc construction request controller 204 modifies the terminal's location, wireless system profile, or ad hoc network profile (Step S56), returns to Step S51, and repeats the above operations. The modification here may involve placing a limit on the transmission power, decreasing the transmission power by a predetermined amount, moving the location, or changing the frequency by a predetermined value.

When the hot spot request controller 202 and ad hoc participation request controller 203 start up, the data retrieved from the databases 210 is input to the radio wave propagation estimator 205 and information about wireless communications quality such as interferences with the hot spots or ad hoc networks in the target area and radio wave propagation characteristics is output to the message handler 201. Based on the entered information about wireless communications quality, the message handler 201 prepares a network information reply message which contains information as to where services can be received around the terminal 110 which sent the hot spot request message or ad hoc participation request message and outputs it to the terminal via the input/output terminal 200 (see Step S25 in FIG. 8). The network information reply message contains communications quality information, congestion information, etc. described later.

Upon receiving the network information reply message, the terminal 110 displays, for the user, the location of the hot spot or ad hoc network nearest to the terminal's location. Also, the terminal 110 can display visually, for the user, conditions (communications quality information) of service areas including the communications quality provided by the narrow-area wireless communications system of the hot spot or ad hoc network by superimposing them over map information, for example, as follows:

High-quality area: white

Low-quality area: black

Border area between high- and low-quality areas: gray

By viewing the display, the user can know, for example, the hot spot or ad hoc network nearest to the current location.

The wireless area information server 130 can estimate the degree of congestion of a hot spot by inquiring of its base station about the number of terminals to which each base station of the hot spot provides service. Regarding ad hoc networks, the wireless area information server 130 can estimate the degree of congestion of an ad hoc network by inquiring of its organizer about the number of users being connected to it. In this case, it is possible to include the degree of congestion of the hot spot or ad hoc network in the network information reply message in response to a hot spot request control message or ad hoc participation request message.

Upon receiving the network information reply message containing the degree of congestion, the terminal 110 can display it visually for the user by superimposing it over map information, for example, as follows:

Congested area with a large number of connecting users: red

Uncongested area with a small number of connecting users: blue

Intermediate area between congested and uncongested areas: yellow

By viewing the display, the user can know, for example, the hot spot or ad hoc network nearest to the current location, avoiding congested areas.

On the other hand, when the ad hoc construction request controller 204 starts up, the terminal's location, wireless system profile, and ad hoc network which characterize the prospective ad hoc network to be newly constructed profile is input in the message handler 201. Based on this information, the message handler 201 prepares a network information reply message and outputs it to the terminal 110 which sent the ad hoc construction request message via the input/output terminal 200. The terminal 110 displays the received message for the user together with information necessary to construct a new ad hoc network without causing or receiving interference.

In the above embodiment, ad hoc networks do not need to be stationary and may be moved. Any such movement can be treated as construction of a new ad hoc network using an ad hoc construction request message. Besides, the data in the hot spot network database 210-2 may be changed dynamically with new construction and removal of base stations. Similarly, the data in the map/structure database 210-3 may be updated to reflect construction of buildings and relocation of furniture. The data in the hot spot network database 210-2 and map/structure database 210-3 maybe updated by a network administrator or the like through an updating input terminal (not shown) either periodically or when any change is made to network configuration or structures. Also, it is possible to store outputs of the radio wave propagation estimator 205 and use them instead of estimating radio wave propagation each time a request message is received.

Figure 12:
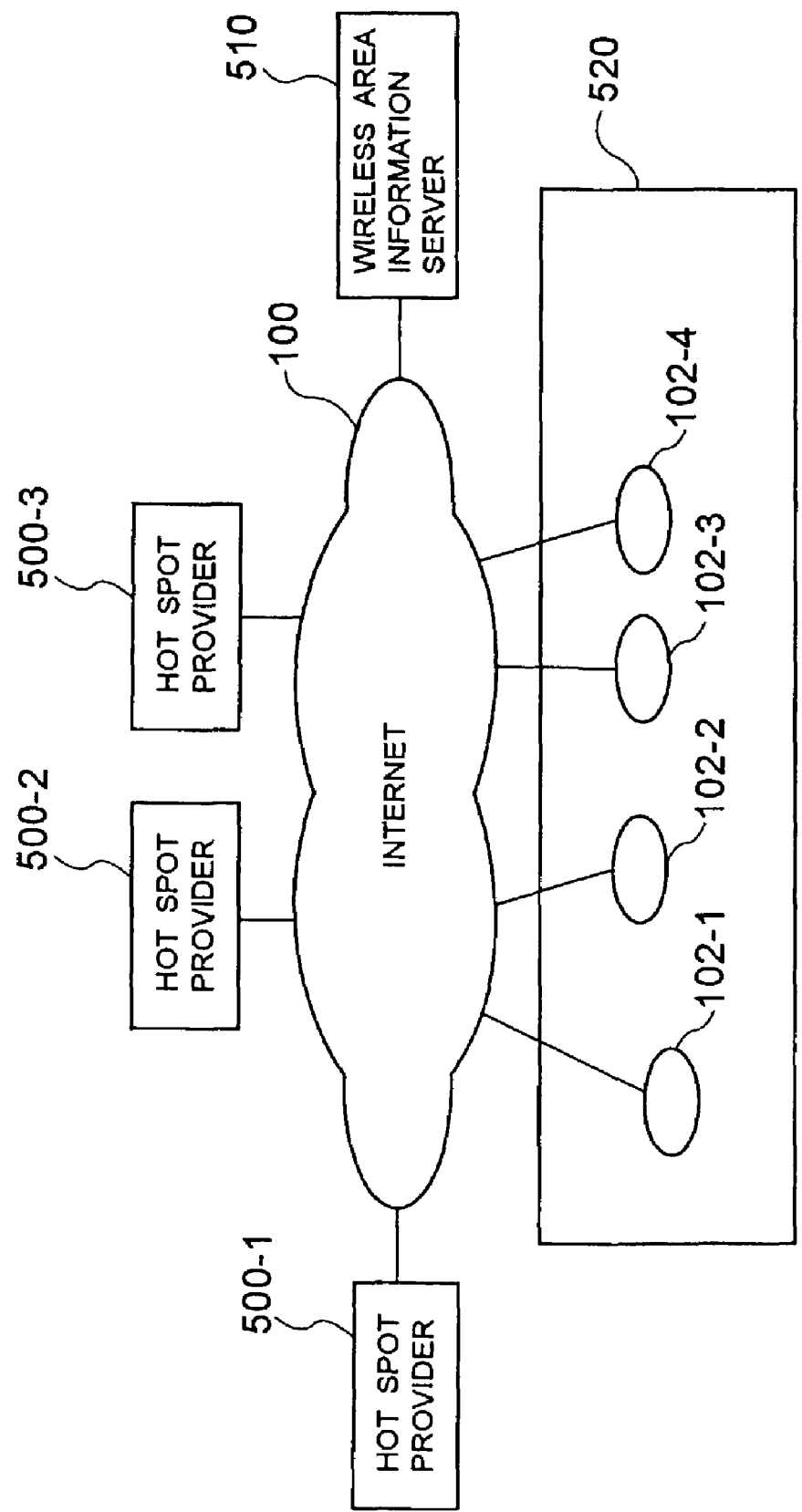
FIG. 12 is an exemplary system configuration illustrating a second embodiment of the present invention.

A second embodiment of the present invention will be described by taking the system configuration in FIG. 12 as an example. In the figure, reference numeral 100 denotes the Internet, 102-1 to 102-4 denote hot spot wireless service areas, 500-1 to 500-3 denote hot spot wireless communications service providers, 510 denotes a wireless area information server, and 520 denote a building such as a shopping mall or airport which contain the hot spot wireless service areas 102-1 to 102-4.

The hot spot wireless service areas 102-1 to 102-4 are connected to the Internet 100 and provide Internet 100 connection services to users. The hot spot wireless service areas 102-1 to 102-4 may be managed by any of the hot spot wireless communications service providers 500-1 to 500-3 or all of them may be managed by a single hot spot wireless communications service provider, for example, 500-1.

Figure 13:
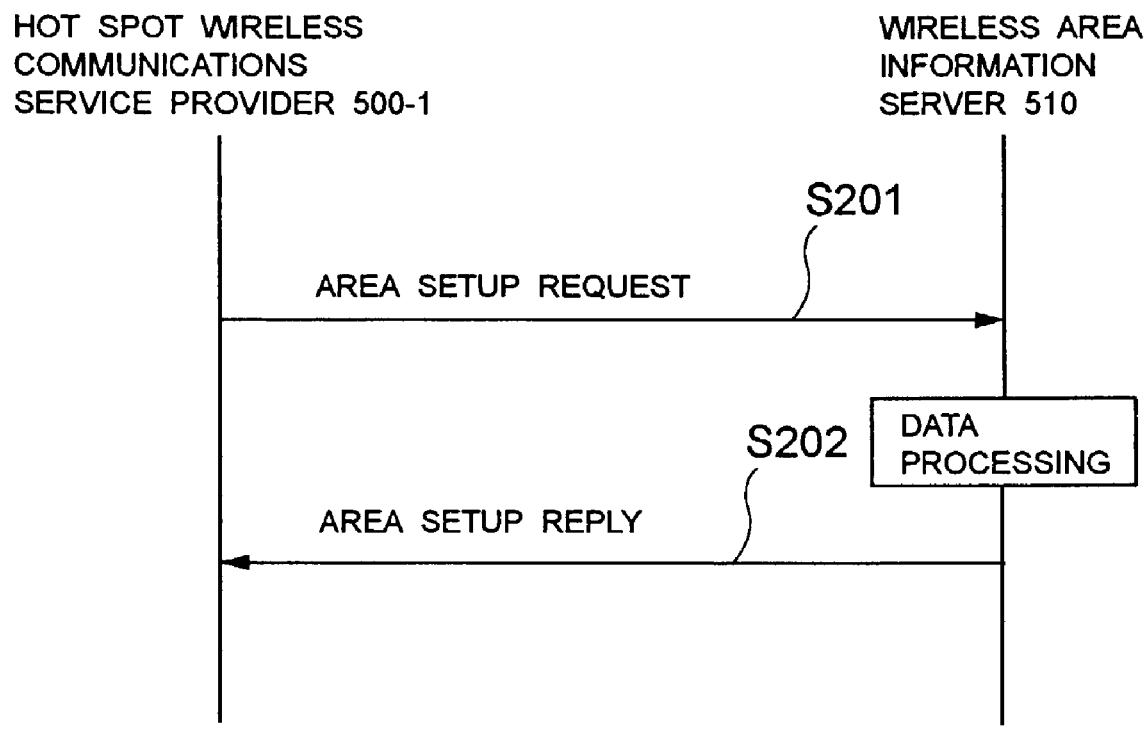
FIG. 13 is an exemplary sequence according to the second embodiment of the present invention.

In these circumstances, consider a case in which, for example, the hot spot wireless communications service provider 500-1 adds a new hot spot wireless service area. An exemplary basic sequence is shown in FIG. 13. The hot spot wireless communications service provider 500-1 sends a message to a wireless area information server 510, requesting permission to set up a new area (S201).

Figure 14:
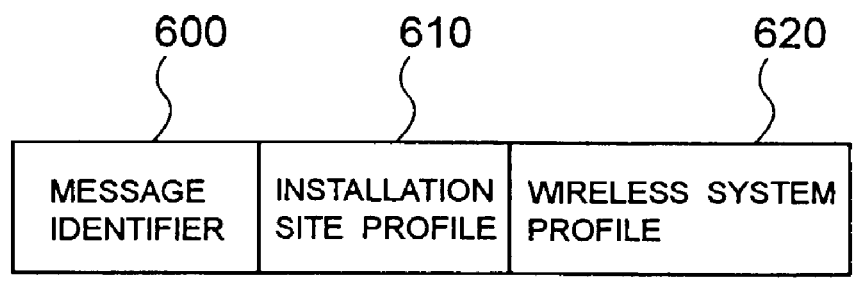
FIG. 14 is a sample format of a hot spot base station request message, hot spot area request message, hot spot base station reply message, and hot spot area reply message.

The message requesting permission for a new area can employ, for example, the format shown in FIG. 14. In the figure, reference numeral 600 denotes a message identifier field, 610 denotes an installation site profile field, and 620 denotes wireless system profile field. The message requesting permission for a new area can be either a hot spot base station request message or hot spot area request message. The message identifier field 600 contains an identifier for distinguishing between the two types of message. The hot spot base station request message and hot spot area request message can be configured, for example, as follows.

Hot spot base station request message:

The installation site profile field 610 contains the location for installing a base station to provide hot spot communications services. The location may be an absolute location such as 35.2234 degrees north latitude, 135.2344 degrees east longitude, and 35.8 m above sea level; address; structure name of the building or the like desired to be installed; etc. The wireless system profile field 620 contains parameters which characterize the wireless system, such as the wireless system to be used, frequency desired to be used and transmission rates desired to be provided.

Hot spot area request message:

The installation site profile field 610 contains the area where hot spot communications services are desired to be provided. The area may be an area expressed in absolute area such as 35.2234 to 35.2235 degrees north latitude, 135.2344 to 135.2345 degrees east longitude, and 35.8 to 36.8 m above sea level; address; structure group such as the buildings contained in the service area or the like; etc. The wireless system profile field 620 contains parameters which characterize the wireless system, such as the wireless system to be used, frequency desired to be used and transmission rates desired to be provided.

Upon receiving a hot spot base station request message or hot spot area request message, the wireless area information server 510 starts processing based on the received message and sends an area setup reply message—a message which presents conditions for setting up a new area—to the hot spot wireless communications service provider, for example, 500-1 which sent the request message (S202).

The hot spot base station request message and hot spot area request message can have, for example, the format shown in FIG. 14. The message identifier field 600 contains an identifier for distinguishing between the two types of message. The hot spot base station request message and hot spot area request message can be configured, for example, as follows. The installation site profile field 610 contains the location for installing a base station to provide hot spot communications services. The location may be an absolute location such as 35.2234 degrees north latitude, 135.2344 degrees east longitude, and 35.8 m above sea level; address; structure name of the building or the like desired to be installed; etc.

The wireless system profile field 620 contains parameters needed to set up the wireless system, such as frequency which can provide appropriate service quality allowing by taking into consideration of interference, transmission rates which can be provided, and transmission power as well as the wireless system used. Also, interferences expected to be caused and received by the new hot spot may also be entered as additional information.

Figure 15:
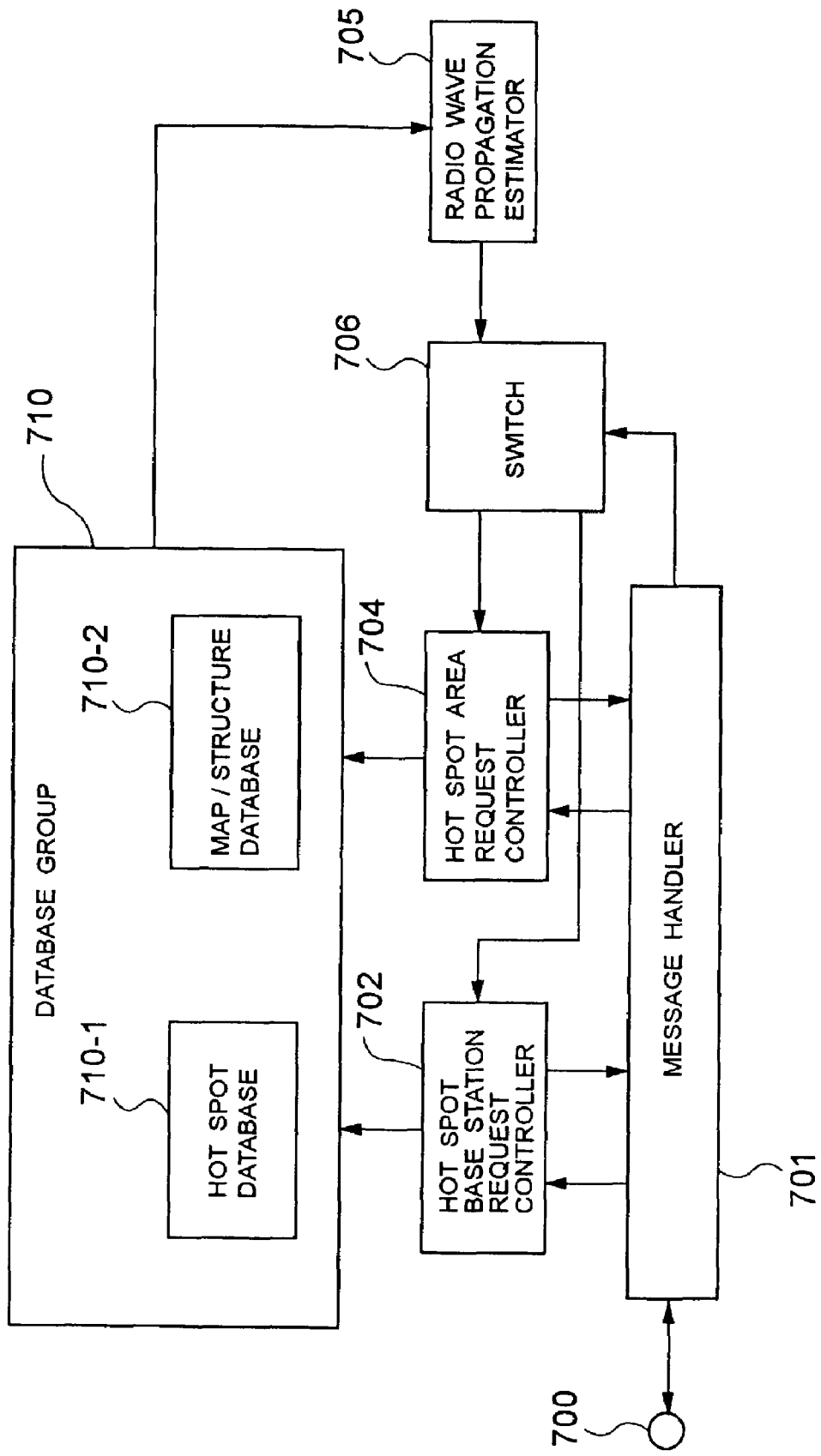
FIG. 15 is a system diagram showing an example of a wireless area information server 510.

The wireless area information server 510 can be configured, for example, as shown in FIG. 15. In the figure, reference numeral 700 denotes an input/output terminal, 701 denotes a message handler, 702 denotes a hot spot base station request controller, 704 denotes a hot spot area request controller, 705 denotes a radio wave propagation estimator, 706 denotes a switch, and 710 denotes a database group, which consists of a hot spot network database 710-1 (hereinafter abbreviated to the hot spot database) and a map/structure database 710-2. The message handler 701 receives hot spot base station request messages or hot spot area request messages via the input/output terminal 700.

By referring to the message identifier field 600 of the received message, the message handler 701 sends the message to the hot spot base station request controller 702 if it is a hot spot base station request message, or to the hot spot area request controller 704 if it is a hot spot area request message. Also, it controls the switch 706 so as to supply the output of the radio wave propagation estimator 705 to the hot spot base station request controller 702 if the received message is a hot spot base station request message, or to the hot spot area request controller 704 if the received message is a hot spot area request message.

Now, operations of the hot spot base station request controller 702, hot spot area request controller 704, database group 710, and radio wave propagation estimator 705 will be described with reference to the flowchart in FIG. 16.

In a profile setting step (S1), the hot spot base station request controller 702 or hot spot area request controller 704 reads the entries of the installation site profile field 610 and wireless system profile field 620 in the hot spot base station request message or hot spot area request message supplied from the message handler 701 and stores the entries in a working memory of a temporary memory such as a RAM as an installation site profile and wireless system profile.

A hot spot database update step (S2) is run by the hot spot base station request controller 702 or hot spot area request controller 704 depending on the message received from the input/output terminal 700. Information about the requested new hot spot contained in the installation site profile and wireless system profile is added to the hot spot network database 710-1. Incidentally, the hot spot network database 710-1 can be configured, for example, as shown in FIG. 6.

A data extraction step (S3) for estimating radio wave propagation is run by the hot spot base station request controller 702 or hot spot area request controller 704 depending on the message received from the input/output terminal 700. A propagation estimation area in which radio wave propagation will be estimated is determined based on the installation site profile, and then map/structure data for the propagation estimation area is extracted from the map/structure database 710-2 and output to the radio wave propagation estimator 705. Also, based on the wireless system profile, data about other relevant hot spots which will cause or receive interferences to/from the new hot spot is extracted and output to the radio wave propagation estimator 705.

In a radio wave propagation estimation step (S4), the radio wave propagation estimator 705 estimates radio wave propagation in the propagation estimation area based on the data extracted in the data extraction step S3 for estimating radio wave propagation, estimates communications service quality in the propagation estimation area, taking into consideration radio interference, propagation loss, and delay distortion, and outputs the estimated communications service quality.

A determination step (S5) is run by the hot spot base station request controller 702 or hot spot area request controller 704, which receives the output of radio wave propagation estimation step S4 via the switch 706 controlled by the message handler 701. In this step, the appropriate request controller determines whether satisfactory communications service can be provided after the opening of the new hot spot, by evaluating the communications service quality estimated in the radio wave propagation estimation step S4. If satisfactory communications service can be provided, a reply message output step S6 is carried out. If satisfactory communications services cannot be provided, a hot spot database deletion step S7 is carried out. The evaluation is made by comparing the communications service quality with a predetermined threshold.

If it is determined in the determination step S5 that satisfactory communications services can be provided, then in the reply message output step (S6), the hot spot base station request controller 702 or hot spot area request controller 704 generates a hot spot base station reply message or hot spot area reply message based on the installation site profile or wireless system profile stored in a work area and outputs the generated message to the message handler 701.

If it is determined in the determination step S5 that satisfactory communications services cannot be provided, then in the hot spot database deletion step (S7), the hot spot base station request controller 702 or hot spot area request controller 704 deletes data in the hot spot network database 710-1 based on the installation site profile or wireless system profile stored in the working memory of the temporary memory such as a RAM.

If it is determined in the determination step S5 that satisfactory communications services cannot be provided, then in an installation site profile/wireless system profile update step (S8), the hot spot base station request controller 702 or hot spot area request controller 704 modifies the installation site profile or wireless system profile so that satisfactory communications services can be provided. The modification can be made using a method similar to the one used in Step S56 of the flowchart in FIG. 11 described above. After the modification, the hot spot database update step S2 and subsequent steps are repeated.

Via the input/output terminal 700, the message handler 701 sends the hot spot base station reply message or hot spot area reply message generated by the above processes to the hot spot service provider 501-1 that sent the hot spot base station request message or hot spot area request message.

Figure 16:
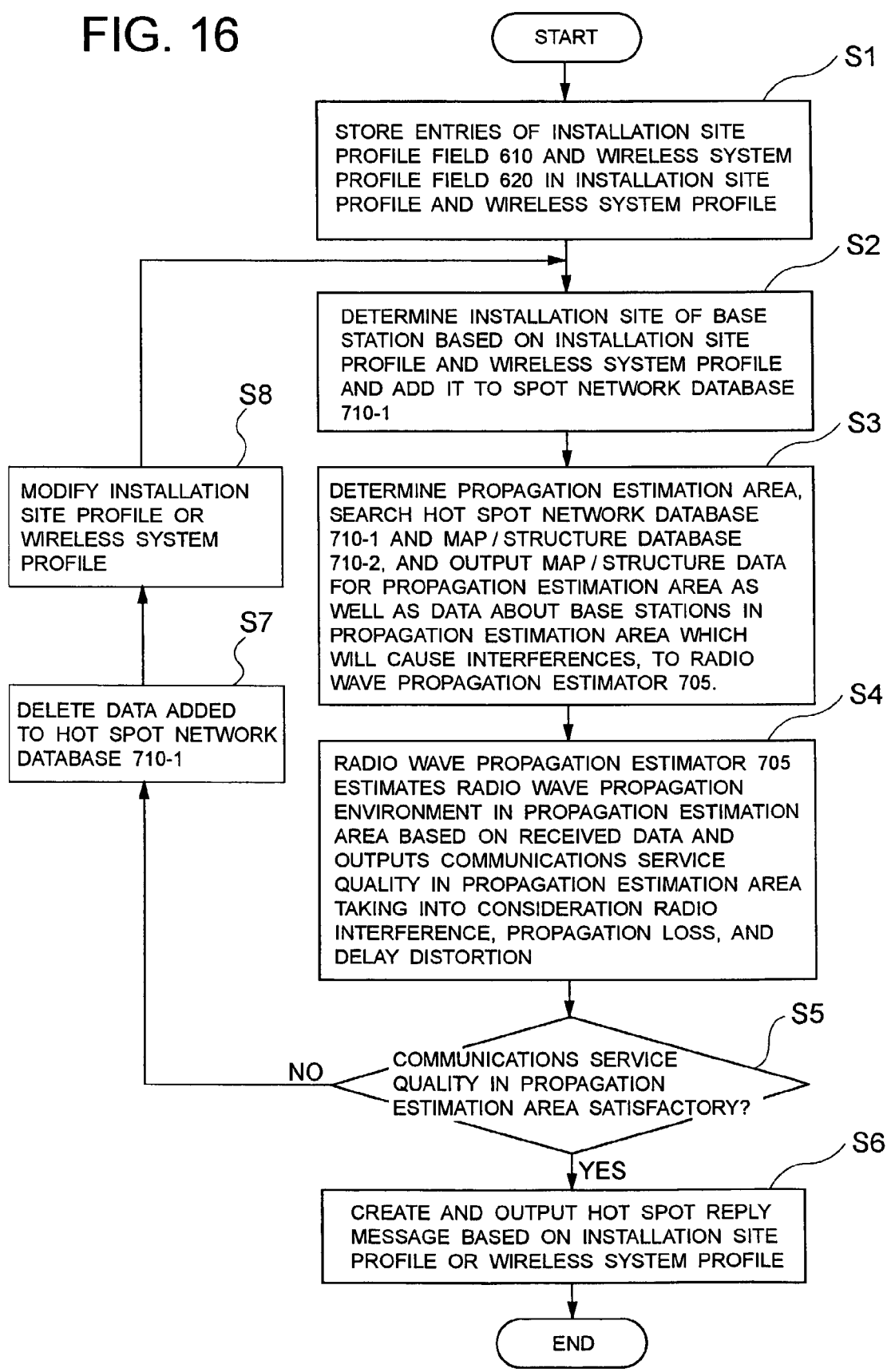
FIG. 16 is a flowchart showing exemplary operations of a hot spot base station request controller 702, hot spot area request controller 704, database group 710, and radio wave propagation estimator 705.
Figure 17:
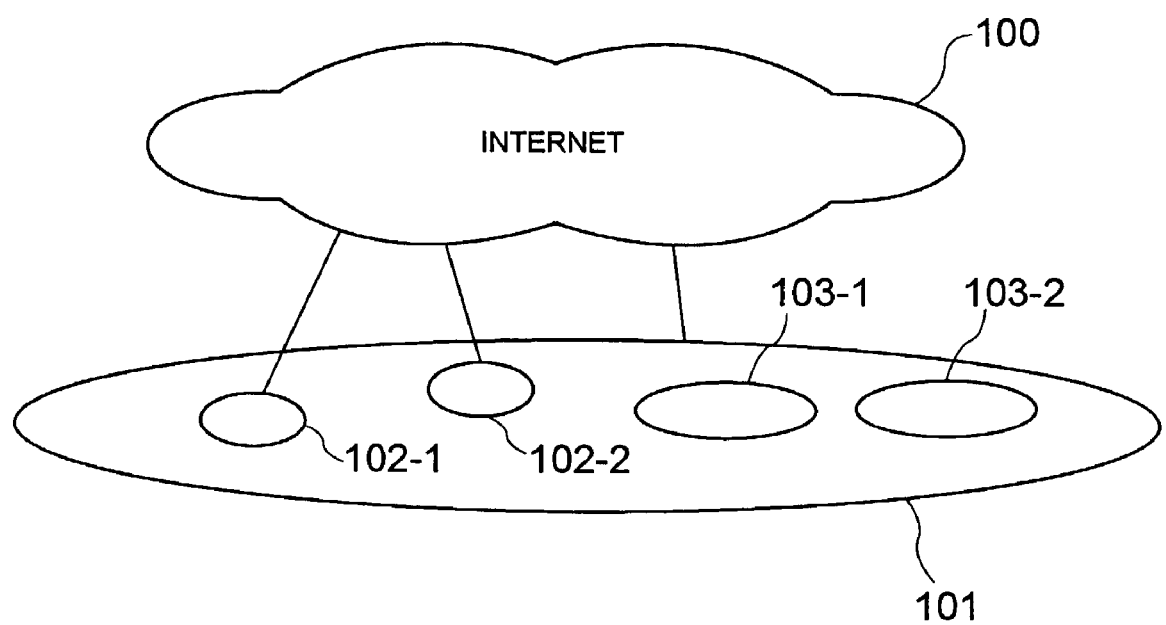
FIG. 17 is a diagram showing a configuration of a system in which wireless systems coexist.

It is possible to set an upper limit on the number of times which the loop in the flowchart of FIG. 16 can be repeated and configure the radio wave propagation estimator 705 to reject the request made in the hot spot base station request message or hot spot area request message when the upper limit is exceeded.

The opening of a new hot spot has been described in this embodiment. To remove a hot spot, the data about the hot spot can be removed from the hot spot network database 710-1. Also, the data of the map/structure database 710-2 can be updated, as required, to accommodate changes such as construction of a new building or additional walls.

Regarding the operation flows described above in FIGS. 8 to 11 and FIG. 16, needless to say, the procedures may be stored beforehand as programs in a recording medium, and then read and executed by a computer to perform operation control.

As described above, the present invention can provide information needed for the user to connect to an appropriate wireless system in situations where wireless systems which have wide service areas, wireless systems which have narrow service areas, and wireless systems which provide ad hoc services coexist, and thus can improve services for the user.

Also, even if a plurality of hot spot service operators that differ in service policies coexist, the present invention can indicate a layout of base stations which provide hot spot services, taking into consideration radio interference, propagation loss, and delay distortion, so that high quality communications services can be provided.

What is claimed is:

1. A network service information providing system in a communications system which contains a mixture of narrow-area wireless communications systems for providing wireless communications service to designated areas and wide-area wireless communications systems for providing wireless communications service to areas wider than said designated areas and which includes terminals capable of connecting at least to said wide-area wireless communications systems, comprising:

network service information detecting means which possesses information about each of said narrow-area wireless communications systems and which provides information about service areas of said narrow-area wireless communications systems as network service information to said terminals in response to requests from said terminals via said wide-area wireless communications systems, wherein:

at least one of said narrow-area wireless communications systems comprises hot spot wireless communications systems connected to a trunk network to which said wide-area wireless communications systems are also connected, and ad hoc wireless communications systems which are not connected to said trunk network and are formed temporarily of only terminals; and each of said requests comprises a request to connect to one of said ad hoc wireless communications systems or one of said hot spot wireless communications systems, and a construction request to newly construct another of said ad hoc wireless communications systems.

2. The network service information providing system according to claim 1, wherein each of said terminals comprises means for sending its location information and conditions for the narrow-area wireless communications system to which it wants to connect, as one of said requests to said network service information detecting means via appropriate one of said wide-area wireless communications systems.

3. The network service information providing system according to claim 1, wherein said network service information detecting means comprises:
   databases which store data related to wireless transmission of each of said narrow-area wireless communications systems, information about locations of base stations for providing communications service from each of said narrow-area wireless communications systems, and information about structures which affect radio wave propagation and geographical information; and
   means for estimating communications service quality which can be provided by each of said narrow-area wireless communications systems, taking into consideration radio interference between said narrow-area wireless communications systems, radio wave propagation loss, and delay distortion and providing the estimated communications service quality as said network service information.

4. The network service information providing system according to claim 1, wherein said network service information detecting means comprises:
   databases which store data related to wireless transmission of each of said narrow-area wireless communications systems, information about locations of base stations for providing communications service from each of said narrow-area wireless communications systems, and information about structures which affect radio wave propagation and geographical information; and
   means for acquiring degrees of congestion of said narrow-area wireless communications systems and providing said degrees of congestion as said network service information.

5. The network service information providing system according to claim 1, wherein said network service information detecting means possesses information for authenticating users who can connect to said ad hoc wireless communications systems, information about forms of communications services provided by said ad hoc wireless communications systems, and communications content provided by said ad hoc wireless communications systems, as information about said ad hoc wireless communications systems.

6. The network service information providing system according to claim 1, wherein each of said terminals comprises means for receiving said network service information and outputting visualized information obtained by superimposing the network service information over geographical information of surroundings around the terminal.

7. The network service information providing system according to claim 1, wherein said requests includes:
   a first type of request that corresponds to a hot spot base station request; and
   a second type of request that corresponds to a host sport area request,
   wherein each of said requests includes an installation site profile field that includes either information corresponding to a location for installing a base station if said respective request is the first type of request or information corresponding to an area where hot spot communications services are desired if said respective request is the second type of request, and a wireless system profile field that includes parameters which characterize a wireless system to be used.

8. A network service information providing system in a wireless communications system which contains narrow-area communications systems for providing wireless communications service to designated areas, comprising:
   network service information detecting means which estimates communications service quality resulting from installation of the new narrow-area wireless communications system in response to an installation request to install a new narrow-area wireless communications system, and provides installation conditions by modifying said installation request if it is estimated that the communications service quality will fall below a designated threshold.

9. The network service information providing system according to claim 8, wherein said installation request contains the location of a base station for providing communications service by said new narrow-area wireless communications system.

10. The network service information providing system according to claim 8, wherein said installation request contains an area to which communications service will be provided by said new narrow-area wireless communications system.

11. The network service information providing system according to claim 8, wherein said network service information detecting means comprises:
   databases which store data related to wireless transmission of each of said narrow-area wireless communications systems, information about locations of base stations for providing communications service from each of said narrow-area wireless communications systems, and information about structures which affect radio wave propagation and geographical information; and
   means for estimating communications service quality which can be provided by the narrow-area wireless communications system based on said installation request and communications service quality which can be provided by each of existing narrow-area wireless communications systems, taking into consideration radio interference between said narrow-area wireless communications systems, radio wave propagation loss, and delay distortion.

12. A network service information providing apparatus in a communications system which contains a mixture of narrow-area wireless communications systems for providing wireless communications service to designated areas and wide-area wireless communications systems for providing wireless communications service to areas wider than said designated areas, wherein said network service information providing apparatus is intended to provide network service information to a terminal capable of connecting at least to said wide-area wireless communications systems and comprises:
   network service information detecting means which possesses information about each of said narrow-area wireless communications systems and which provides information about service areas of said narrow-area wireless communications systems as network service information to said terminals in response to requests from said terminals via said wide-area wireless communications systems, wherein:
at least one of said narrow-area wireless communications systems comprises hot spot wireless communications systems connected to a trunk network to which said wide-area wireless communications systems are also connected, and ad hoc wireless communications systems which are not connected to said trunk network and are formed temporarily of only a terminal; and each of said requests comprises a request to connect to one of said ad hoc wireless communications systems or one of said hot spot wireless communications systems, and a construction request to newly construct another of said ad hoc wireless communications systems.

13. The network service information providing apparatus according to claim 12, wherein each of said requests contains location information of the requesting terminal and conditions for the narrow-area wireless communications system which said terminal wants to connect to.

14. The network service information providing apparatus according to claim 12, comprising:
databases which store data related to wireless transmission of each of said narrow-area wireless communications systems, information about locations of base stations for providing communications service from each of said narrow-area wireless communications systems, and information about structures which affect radio wave propagation and geographical information; and
means for estimating communications service quality which can be provided by each of said narrow-area wireless communications systems, taking into consideration radio interference between said narrow-area wireless communications systems, radio wave propagation loss, and delay distortion and providing the estimated communications service quality as said network service information.

15. The network service information providing apparatus according to claim 12, comprising:
databases which store data related to wireless transmission of each of said narrow-area wireless communications systems, information about locations of base stations for providing communications service from each of said narrow-area wireless communications systems, and information about structures which affect radio wave propagation and geographical information; and
means for acquiring degrees of congestion of said narrow-area wireless communications systems and providing said degrees of congestion as said network service information.

16. The network service information providing apparatus according to claim 12, having information for authenticating users who can connect to said ad hoc wireless communications systems, information about forms of communications services provided by said ad hoc wireless communications systems, and communications content provided by said ad hoc wireless communications systems, as information about said ad hoc wireless communications systems.

17. The network service information providing apparatus according to claim 12, wherein said requests includes:
a first type of request that corresponds to a hot spot base station request; and
a second type of request that corresponds to a host sport area request,
wherein each of said requests includes an installation site profile field that includes either information corresponding to a location for installing a base station if said respective request is the first type of request or information corresponding to an area where hot spot communications services are desired if said respective request is the second type of request, and a wireless system profile field that includes parameters which characterize a wireless system to be used.

18. A network service information providing apparatus for providing network service information in a wireless communications system which contains narrow-area wireless communications systems for providing wireless communications service to designated areas, comprising:
network service information detecting means which estimates communications service quality resulting from installation of the new narrow-area wireless communications system in response to an installation request to install a new narrow-area wireless communications system, and provides installation conditions by modifying said installation request if it is estimated that the communications service quality will fall below a designated threshold.

19. The network service information providing apparatus according to claim 18, wherein said installation request contains the location of a base station for providing communication service by said new narrow-area wireless communications system.

20. The network service information providing apparatus according to claim 18, wherein said installation request contains an area to which communications service will be provided by said new narrow-area wireless communications system.

21. The network service information providing apparatus according to claim 18, wherein said network service information detecting means comprises:
databases which store data related to wireless transmission of each of said narrow-area wireless communications systems, information about locations of base stations for providing communications service from each of said narrow-area wireless communications systems, and information about structures which affect radio wave propagation and geographical information; and
means for estimating communications service quality which can be provided by the narrow-area wireless communications system based on said installation request and communications service quality which can be provided by each of existing narrow-area wireless communications systems, taking into consideration radio interference between said narrow-area wireless communications systems, radio wave propagation loss, and delay distortion.

22. A network service information providing method in a communications system which contains a mixture of narrow-area wireless communications systems for providing wireless communications service to designated areas and wide-area wireless communications systems for providing wireless communications service to areas wider than said designated areas and which includes terminals capable of connecting at least to said wide-area wireless communications systems as well as includes a network service information providing apparatus intended to provide network service information in response to requests from said terminals, comprising in said network service information providing apparatus:
a step of preparing information about each of said narrow-area wireless communications systems and providing information about service areas of said narrow-area wireless communications systems as network service information to said terminals in response to requests from said terminals via said wide-area wireless communications systems, wherein:
at least one of said narrow-area wireless communications systems comprises hot spot wireless communications systems connected to a trunk network to which said wide-area wireless communications systems are also connected, and ad hoc wireless communications systems which are not connected to said trunk network and are formed temporarily of only a terminal; and each of said requests comprises a request to connect to one of said ad hoc wireless communications systems or one of said hot spot wireless communications systems, and a construction request to newly construct another of said ad hoc wireless communications systems.

23. The network service information providing method according to claim 22, comprising, in said terminals, a step of sending location information of the requesting terminal and conditions for the narrow-area wireless communications system to which the terminal wants to connect, as one of said requests to said network service information providing apparatus, via appropriate one of said wide-area wireless communications systems.

24. The network service information providing method according to claim 22, in said network service information providing apparatus comprising the steps of:
preparing databases which store data related to wireless transmission of each of said narrow-area wireless communications systems, information about locations of base stations for providing communications service from each of said narrow-area wireless communications systems, and information about structures which affect radio wave propagation and geographical information; and
estimating communications service quality which can be provided by each of said narrow-area wireless communications systems, taking into consideration radio interference between said narrow-area wireless communications systems, radio wave propagation loss, and delay distortion and providing the estimated communications service quality as said network service information.

25. The network service information providing method according to claim 22, in said network service information providing apparatus comprising the steps of:
preparing databases which store data related to wireless transmission of each of said narrow-area wireless communications systems, information about locations of base stations for providing communications service from each of said narrow-area wireless communications systems, and information about structures which affect radio wave propagation and geographical information; and
acquiring degrees of congestion of said narrow-area wireless communications systems and providing said degrees of congestion as said network service information.

26. The network service information providing method according to claim 22, wherein information about said ad hoc wireless communications systems includes information for authenticating users who can connect to said ad hoc wireless communications systems, information about forms of communications services provided by said ad hoc wireless communications systems, and communications content provided by said ad hoc wireless communications systems.

27. The network service information providing method according to claim 22, in said terminals, comprising a step of receiving said network service information and outputting visualized information obtained by superimposing the network service information over geographical information of surroundings around the terminal.

28. The network service information providing method according to claim 22, wherein said requests includes:
a first type of request that corresponds to a hot spot base station request; and
a second type of request that corresponds to a host sport area request,
wherein each of said requests includes an installation site profile field that includes either information corresponding to a location for installing a base station if said respective request is the first type of request or information corresponding to an area where hot spot communications services are desired if said respective request is the second type of request, and a wireless system profile field that includes parameters which characterize a wireless system to be used.

29. A network service information providing method in a wireless communications system which contains narrow-area wireless communications systems for providing wireless communications service to designated areas, comprising:
a step of estimating communications service quality resulting from installation of the new narrow-area wireless communications system in response to an installation request to install a new narrow-area wireless communications system, and offering installation conditions by modifying said installation request if it is estimated that the communications service quality will fall below a designated threshold.

30. The network service information providing method according to claim 29, wherein said installation request contains the location of a base station for providing communications service by said new narrow-area wireless communications system.

31. The network service information providing method according to claim 29, wherein said installation request contains an area to which communications service will be provided by said new narrow-area wireless communications system.

32. The network service information providing method according to claim 29, in said network service information providing apparatus comprising the steps of:
preparing databases which store data related to wireless transmission of by each of said narrow-area wireless communications systems, information about locations of base stations for providing communications service from each of said narrow-area wireless communications systems, and information about structures which affect radio wave propagation and geographical information; and
estimating communications service quality which can be provided by the narrow-area wireless communications system based on said installation request as well as communications service quality which can be provided by each of existing narrow-area wireless communications systems, taking into consideration radio interference between said narrow-area wireless communications systems, radio wave propagation loss, and delay distortion.

33. An operation control method for a network service information providing apparatus in a communications system which contains a mixture of narrow-area wireless communications systems for providing wireless communications service to designated areas and wide-area wireless communications systems for providing wireless communications service to areas wider than said designated areas and which includes terminals capable of connecting at least to said wide-area wireless communications systems as well as includes said network service information providing apparatus intended to provide network service information in response to requests from said terminals, comprising:

a step of preparing information about each of said narrow-area wireless communications systems and providing information about service areas of said narrow-area wireless communications systems as network service information to said terminals in response to requests from said terminals via said wide-area wireless communications systems, wherein:

at least one of said narrow-area wireless communications systems comprises hot spot wireless communications systems connected to a trunk network to which said wide-area wireless communications systems are also connected, and ad hoc wireless communications systems which are not connected to said trunk network and are formed temporarily of only a terminal; and each of said requests comprises a request to connect to one of said ad hoc wireless communications systems or one of said hot spot wireless communications systems, and a construction request to newly construct another of said ad hoc wireless communications systems.

34. The operation control method according to claim 33, comprising the steps of:

preparing databases which store data related to wireless transmission of each of said narrow-area wireless communications systems, information about locations of base stations for providing communications service from each of said narrow-area wireless communications systems, and information about structures which affect radio wave propagation and geographical information; and estimating communications service quality which can be provided by each of said narrow-area wireless communications systems, taking into consideration radio interference between said narrow-area wireless communications systems, radio wave propagation loss, and delay distortion as the result of presuming communications service quality and providing the estimated communications service quality as said network service information.

35. The operation control method according to claim 33, comprising the steps of:

preparing databases which store data related to wireless transmission of each of said narrow-area wireless communications systems, information about locations of base stations for providing communications service from each of said narrow-area wireless communications systems, and information about structures which affect radio wave propagation and geographical information; and acquiring degrees of congestion of said narrow-area wireless communications systems and providing said degrees of congestion as said network service information.

36. The operation control method according to claim 33, wherein information about said ad hoc wireless communications systems includes information for authenticating users who can connect to said ad hoc wireless communications systems, information about forms of communications services provided by said ad hoc wireless communications systems, and communications content provided by said ad hoc wireless communications systems.

37. The operation control method according to claim 33, wherein said requests includes:

a first type of request that corresponds to a hot spot base station request; and a second type of request that corresponds to a host sport area request, wherein each of said requests includes an installation site profile field that includes either information corresponding to a location for installing a base station if said respective request is the first type of request or information corresponding to an area where hot spot communications services are desired if said respective request is the second type of request, and a wireless system profile field that includes parameters which characterize a wireless system to be used.

38. An operation control method for a network service information providing apparatus in a wireless communications system which contains a narrow-area wireless communications systems for providing wireless communications service to designated areas, said operation control method comprising:

a step of estimating communications service quality resulting from installation of the new narrow-area wireless communications system in response to an installation request to install a new narrow-area wireless communications system, and offering installation conditions by modifying said installation request if it is estimated that the communications service quality will fall below a designated threshold.

39. The operation control method according to claim 38, wherein said installation request contains the location of a base station for providing communications service by said new narrow-area wireless communications system.

40. The operation control method according to claim 38, wherein said installation request contains an area to which communications service will be provided by said new narrow-area wireless communications system.

41. The operation control method according to claim 38, comprising the steps of:

preparing databases which store data related to wireless transmission of each of said narrow-area wireless communications systems, information about locations of base stations for providing communications service from each of said narrow-area wireless communications systems, and information about structures which affect radio wave propagation and geographical information; and estimating communications service quality which can be provided by the narrow-area wireless communications system based on said installation request as well as communications service quality which can be provided by each of existing narrow-area wireless communications systems, taking into consideration radio interference between said narrow-area wireless communications systems, radio wave propagation loss, and delay distortion.

42. A terminal in a network service information providing system which contains a mixture of narrow-area wireless communications systems for providing wireless communications service to designated areas and wide-area wireless communications systems for providing wireless communications service to areas wider than said designated areas and which includes a network service information providing apparatus that possesses information about each of said narrow-area wireless communications systems and that provides information about service areas of said narrow-area wireless communications systems as network service information to said terminals in response to requests from said terminals via said wide-area wireless communications systems, comprising:

means for sending its location information and conditions for the narrow-area wireless communications system to which it wants to connect, as one of said requests to said network service information providing apparatus via appropriate one of said wide-area wireless communications systems, wherein:
at least one of said narrow-area wireless communications systems comprises hot spot wireless communications systems connected to a trunk network to which said wide-area wireless communications systems are also connected, and ad hoc wireless communications systems which are not connected to said trunk network and are formed temporarily of only a terminal; and each of said requests comprises a request to connect to one of said ad hoc wireless communications systems or one of said hot spot wireless communications systems, and a construction request to construct a new ad hoc wireless communications system.

43. The terminal according to claim 42, comprising means for receiving said network service information and outputting visualized information obtained by superimposing the network service information over geographical information of surroundings around the terminal.

44. The terminal according to claim 42, wherein said network service information is obtained by estimating communications service quality which can be provided by each of said narrow-area wireless communications systems, taking into consideration radio interference between said narrow-area wireless communications systems, radio wave propagation loss, and delay distortion as the result of presuming communications service quality.

45. The terminal according to claim 42, wherein said network service information represents degrees of congestion of said narrow-area wireless communications systems.

46. A computer readable medium encoded with a computer program for making a computer execute operations of a network service information providing apparatus in a communications system which contains a mixture of narrow-area wireless communications systems for providing wireless communications service to designated areas and wide-area wireless communications systems for providing wireless communications service to areas wider than said designated areas and which includes terminals capable of connecting at least to said wide-area wireless communications systems as well as includes said network service information providing apparatus intended to provide network service information in response to requests from said terminals, wherein said computer, when executing said computer program, performs the steps of:
a step of preparing information about each of said narrow-area wireless communications systems and providing information about service areas of said narrow-area wireless communications systems as network service information to said terminals in response to requests from said terminals via said wide-area wireless communications systems, wherein:
at least one of said narrow-area wireless communications systems comprises hot spot wireless communications systems connected to a trunk network to which said wide-area wireless communications systems are also connected, and ad hoc wireless communications systems which are not connected to said trunk network and are formed temporarily of only terminals; and each of said requests comprises a request to connect to one of said ad hoc wireless communications systems or one of said hot spot wireless communications systems, and a construction request to newly construct another of said ad hoc wireless communications systems.

47. A computer readable medium encoded with a computer program for making a computer execute operations of a network service information providing apparatus in a wireless communications system which contains narrow-area wireless communications systems for providing wireless communications service to designated areas, wherein said computer, when executing said computer program, performs the steps of:
a step of estimating communications service quality resulting from installation of the new narrow-area wireless communications system in response to an installation request to install a new narrow-area wireless communications system, and offering installation conditions by modifying said installation request if it is estimated that the communications service quality will fall below a designated threshold.

* * * * *

UNITED STATES PATENT AND TRADEMARK OFFICE
CERTIFICATE OF CORRECTION

| | | |
|---|---|---|
| PATENT NO. | : 7,486,635 B2 | Page 1 of 1 |
| APPLICATION NO. | : 10/273110 | |
| DATED | : February 3, 2009 | |
| INVENTOR(S) | : Kazuhiro Okanoue et al. | |

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by (1,185) days Delete the phrase "by 1,185 days" and insert -- by 1,855 days --

Signed and Sealed this

Sixth Day of April, 2010

David J. Kappos
*Director of the United States Patent and Trademark Office*